United States Patent
Stein

(10) Patent No.: US 12,403,938 B2
(45) Date of Patent: Sep. 2, 2025

(54) PREDICTING AND RESPONDING TO CUT IN VEHICLES AND ALTRUISTIC RESPONSES

(71) Applicant: Mobileye Vision Technologies Ltd., Jerusalem (IL)

(72) Inventor: Gideon Stein, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 18/654,371

(22) Filed: May 3, 2024

(65) Prior Publication Data

US 2024/0286649 A1 Aug. 29, 2024

Related U.S. Application Data

(63) Continuation of application No. 17/710,177, filed on Mar. 31, 2022, now Pat. No. 11,993,290, which is a
(Continued)

(51) Int. Cl.
*B60W 60/00* (2020.01)
*G05D 1/00* (2006.01)
(Continued)

(52) U.S. Cl.
CPC .. *B60W 60/00274* (2020.02); *B60W 60/0016* (2020.02); *G05D 1/0246* (2013.01);
(Continued)

(58) Field of Classification Search
CPC .............................. G08G 1/0962; G08G 1/16
See application file for complete search history.

(56) References Cited

U.S. PATENT DOCUMENTS 8,170,739 B2* 5/2012 Lee ...................... G01C 21/12
701/28
8,378,851 B2 2/2013 Stein et al.
(Continued)

FOREIGN PATENT DOCUMENTS

JP 2002-334330 A 11/2002
JP 2006-205860 A 8/2006

OTHER PUBLICATIONS

Modeling the conscious behavior of drivers for multi-lane highway driving; Luo; Jun. 2012; (Year: 2012).*
(Continued)

*Primary Examiner* — Luis Perez-Fuentes
(74) *Attorney, Agent, or Firm* — Finnegan, Henderson, Farabow, Garrett & Dunner, LLP

(57) ABSTRACT

A vehicle navigation system for detecting and responding to a cut-in by a target vehicle is disclosed. The vehicle navigation system includes at least one processor configured to receive image data captured by an image capture device of the host vehicle; identify, based on analysis of the image data, a target vehicle traveling in a lane adjacent to a lane in which the host vehicle is traveling; determine, based on analysis of the image data, that a predetermined cut in sensitivity change factor is present; and based on the determination that the predetermined cut in sensitivity change factor is present, cause a navigational response in the host vehicle.

23 Claims, 29 Drawing Sheets

Related U.S. Application Data continuation of application No. 16/935,498, filed on Jul. 22, 2020, now Pat. No. 11,372,407, which is a continuation of application No. 16/598,429, filed on Oct. 10, 2019, now abandoned, which is a continuation of application No. 15/360,141, filed on Nov. 23, 2016, now Pat. No. 10,452,069.

(60) Provisional application No. 62/361,343, filed on Jul. 12, 2016, provisional application No. 62/260,281, filed on Nov. 26, 2015.

(51) Int. Cl.
| | |
|---|---|
| *G05D 1/243* | (2024.01) |
| *G05D 1/249* | (2024.01) |
| *G06V 20/56* | (2022.01) |
| *G06V 20/58* | (2022.01) |
| *G08G 1/0962* | (2006.01) |
| *G08G 1/16* | (2006.01) |

(52) U.S. Cl.
CPC ......... *G05D 1/0251* (2013.01); *G05D 1/2435* (2024.01); *G05D 1/249* (2024.01); *G06V 20/58* (2022.01); *G06V 20/588* (2022.01); *G08G 1/09623* (2013.01); *G08G 1/09626* (2013.01); *G08G 1/167* (2013.01); *B60W 2420/403* (2013.01); *B60W 2552/53* (2020.02)

(56) References Cited

U.S. PATENT DOCUMENTS

| | | | |
|---|---|---|---|
| 8,457,827 B1 | 6/2013 | Ferguson et al. | |
| 8,494,716 B1 | 7/2013 | Lee et al. | |
| 8,682,511 B2 | 3/2014 | Andreasson | |
| 8,700,251 B1 | 4/2014 | Zhu et al. | |
| 8,788,134 B1* | 7/2014 | Litkouhi | B60W 30/16 701/23 |
| 8,903,638 B2 | 12/2014 | Lin et al. | |
| 9,045,139 B2 | 6/2015 | Chen et al. | |
| 9,109,907 B2 | 8/2015 | Park et al. | |
| 9,176,500 B1* | 11/2015 | Teller | B60W 30/08 |
| 9,205,835 B2 | 12/2015 | Stein et al. | |
| 9,233,688 B2 | 1/2016 | Clarke et al. | |
| 9,454,150 B2 | 9/2016 | Uehara | |
| 9,682,704 B2 | 6/2017 | Teller et al. | |
| 9,826,200 B2 | 11/2017 | Stein | |
| 9,836,051 B2* | 12/2017 | Ishikawa | B60W 60/0059 |
| 9,892,296 B2 | 2/2018 | Kovarik et al. | |
| 9,892,328 B2 | 2/2018 | Stein et al. | |
| 9,896,101 B2 | 2/2018 | Kato | |
| 10,037,689 B2 | 7/2018 | Taylor | |
| 10,108,195 B2 | 10/2018 | Silvlin et al. | |
| 10,185,879 B2 | 1/2019 | Sakamoto | |
| 10,198,772 B2 | 2/2019 | Parameshwaran | |
| 10,209,712 B2 | 2/2019 | Stein | |
| 10,452,069 B2 | 10/2019 | Stein | |
| 10,991,242 B2 | 4/2021 | Taylor | |
| 11,372,407 B2 | 6/2022 | Stein | |
| 2005/0015203 A1 | 1/2005 | Nishira | |
| 2007/0150196 A1 | 6/2007 | Grimm | |
| 2014/0195093 A1 | 7/2014 | Litkouhi et al. | |
| 2014/0365062 A1 | 12/2014 | Urhahne | |
| 2015/0142248 A1 | 5/2015 | Han et al. | |
| 2015/0210274 A1 | 7/2015 | Clarke et al. | |
| 2015/0321699 A1 | 11/2015 | Rebhan et al. | |
| 2016/0068156 A1 | 3/2016 | Horii | |
| 2017/0106750 A1 | 4/2017 | Tauchi et al. | |
| 2017/0153639 A1 | 6/2017 | Stein | |
| 2017/0154225 A1 | 6/2017 | Stein | |
| 2017/0320491 A1 | 11/2017 | Teller et al. | |

OTHER PUBLICATIONS

Lane change decision Aid system-based motion-driven vehicle tracking; Alonzo; 2008; (Year: 2008).*
Extended Search Report issued European Application No. 24157149.6-1207, dated May 8, 2024 (10 pages).
PCT International Search Report and Written Opinion issued in PCT Application No. PCT/US2016/063525 dated Feb. 9, 2017 (10 pages).
Wang, "Overtaking Vehicle Detection Using Dynamic and Quasi-static Background Modeling" (2005).
Alonzo, "Lane Change Decision Aid System Based Motion-Driven Vehicle Tracking" (2008).
NPL Google Search (2019).
Office Action issued in Chinese Application No. 201680079913.4, dated May 26, 2021 (42 pages).
Office Action issued in Japanese Application No. 2018-526138, dated Dec. 24, 2020 (2 pages).
Communication and Search Report issued from the European Patent Office in counterpart Application No. 20182736.7-1207, dated Oct. 23, 2020 (9 pages).
Ismail Dagli et al., "Action Recognition and Prediction for Driver Assistance Systems Using Dynamic Belief Networks," 12th European Conference on Computer Vision, ECCV 2012 (Jan. 1, 2003).
Examination Report issued from the European Patent Office in counterpart Application No. 20182736.7-1207, dated Sep. 12, 2022 (7 pages).
Luo Yi et al., "Modeling the Conscious Behavior of Drivers for Multi-Lane Highway Driving," Jun. 5, 2022 (7 pages).

* cited by examiner

PREDICTING AND RESPONDING TO CUT IN VEHICLES AND ALTRUISTIC RESPONSES

CROSS REFERENCES TO RELATED APPLICATIONS

This application is a continuation of U.S. patent application Ser. No. 17/710,177, filed Mar. 31, 2022, which is a continuation of U.S. patent application Ser. No. 16/935,498, filed Jul. 22, 2020, now issued as U.S. Pat. No. 11,372,407, which is a continuation of U.S. patent application Ser. No. 16/598,429, filed Oct. 10, 2019, which is a continuation of U.S. patent application Ser. No. 15/360,141, filed Nov. 23, 2016, now U.S. Pat. No. 10,452,069, which claims the benefit of priority of United States Provisional Patent Application No. 62/260,281, filed on Nov. 26, 2015, and U.S. Provisional Patent Application No. 62/361,343, filed on Jul. 12, 2016. All of the foregoing applications are incorporated herein by reference in their entirety.

BACKGROUND

Technical Field

The present disclosure relates generally to autonomous vehicle navigation. Additionally, this disclosure relates to systems and methods for detecting and responding to cut in vehicles, and navigating while taking into consideration an altruistic behavior parameter.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera) and may also use information obtained from other sources (e.g., from a global positioning system (GPS) device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, and travel from one road to another road at appropriate intersections or interchanges.

During navigation, an autonomous vehicle may encounter another vehicle that is attempting a lane shift. For example, a vehicle in a lane to the left or to the right of the lane in which the autonomous vehicle is traveling may attempt to shift, or cut in, to the lane in which the autonomous vehicle is traveling. When such a cut in occurs, the autonomous vehicle must make a navigational response by, for example, changing its velocity or acceleration and/or shifting to another lane to avoid the cut-in by the other vehicle.

In some instances, the other vehicle may appear to attempt a cut in, but the cut in may ultimately not be completed (e.g., because a driver of the other vehicle changes his or her mind or the other vehicle is simply drifting). While delaying effecting a navigational response until a cut in by the other vehicle is sufficiently likely to occur may prevent unnecessary braking, such a delay may also increase the risk of a collision and/or result in braking that may cause discomfort to a person in the autonomous vehicle. Thus, improved prediction of when a vehicle will attempt a cut in is needed.

Moreover, in some cases, a cut in by the other vehicle may be necessitated, e.g., by the roadway and/or traffic rules. In other cases, though, the cut in may be optional, such as when the other vehicle merely wishes to pass a slower moving vehicle. Because an autonomous vehicle may be programmed to travel to a destination in a timely and safe manner, the autonomous vehicle may not necessarily permit the other vehicle to cut in where the cut in is not necessary. In some cases, however, it may be preferable to an operator of the autonomous vehicle and/or for overall traffic efficiency to allow such a cut in. Thus, a cut in process that encompasses altruistic behavior is needed.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras. The navigational response may also take into account other data including, for example, global positioning system (GPS) data, sensor data (e.g., from an accelerometer, a speed sensor, a suspension sensor, etc.), and/or other map data.

Consistent with a disclosed embodiment, a vehicle cut in detection and response system for a host vehicle is provided. The system may include a data interface and at least one processing device. The at least one processing device may be programmed to receive, via the data interface, a plurality of images from at least one image capture device associated with the host vehicle; identify, in the plurality of images, a representation of a target vehicle traveling in a first lane different from a second lane in which the host vehicle is traveling; identify, based on analysis of the plurality of images, at least one indicator that the target vehicle will change from the first lane to the second lane; detect whether at least one predetermined cut in sensitivity change factor is present in an environment of the host vehicle; cause a first navigational response in the host vehicle based on the identification of the at least one indicator and based on a value associated with a first cut in sensitivity parameter where no predetermined cut in sensitivity change factor is detected; and cause a second navigational response in the host vehicle based on the identification of the at least one indicator and based on a value associated with a second cut in sensitivity parameter where the at least one predetermined cut in sensitivity change factor is detected, the second cut in sensitivity parameter being different from the first cut in sensitivity parameter.

Consistent with another disclosed embodiment, a host vehicle may include a body, at least one image capture device, and at least one processing device. The at least one processing device may be programmed to receive a plurality of images from the at least one image capture device; identify, in the plurality of images, a representation of a target vehicle traveling in a first lane different from a second lane in which the host vehicle is traveling; identify, based on analysis of the plurality of images, at least one indicator that the target vehicle will change from the first lane to the second lane; detect whether at least one predetermined cut in sensitivity change factor is present in an environment of the host vehicle; cause a first navigational response in the host vehicle based on the identification of the at least one indicator and based on a value associated with a first cut in sensitivity parameter where no predetermined cut in sensitivity change factor is detected; and cause a second navigational response in the host vehicle based on the identification of the at least one indicator and based on a value associated with a second cut in sensitivity parameter where the at least one predetermined cut in sensitivity change factor is detected, the second cut in sensitivity parameter being different from the first cut in sensitivity parameter.

Consistent with yet another disclosed embodiment, a method is provided for detecting and responding to a cut in by a target vehicle. The method may include receiving, a plurality of images from at least one image capture device associated with a host vehicle; identifying, in the plurality of images, a representation of the target vehicle traveling in a first lane different from a second lane in which the host vehicle is traveling; identifying, based on analysis of the plurality of images, at least one indicator that the target vehicle will change from the first lane to the second lane; detecting whether at least one predetermined cut in sensitivity change factor is present in an environment of the host vehicle; causing a first navigational response in the host vehicle based on the identification of the at least one indicator and based on a value associated with a first cut in sensitivity parameter where no predetermined cut in sensitivity change factor is detected; and causing a second navigational response in the host vehicle based on the identification of the at least one indicator and based on a value associated with a second cut in sensitivity parameter where the at least one predetermined cut in sensitivity change factor is detected, the second cut in sensitivity parameter being different from the first cut in sensitivity parameter.

Consistent with a disclosed embodiment, a navigation system is provided for a host vehicle. The system may include a data interface and at least one processing device. The at least one processing device may be programmed to receive, via the data interface, a plurality of images from at least one image capture device associated with the host vehicle; identify, based on analysis of the plurality of images, at least one target vehicle in an environment of the host vehicle; determine, based on analysis of the plurality of images, one or more situational characteristics associated with the target vehicle; determine a current value associated with an altruistic behavior parameter; and determine based on the one or more situational characteristics associated with the target vehicle that no change in a navigation state of the host vehicle is required, but cause at least one navigational change in the host vehicle based on the current value associated with the altruistic behavior parameter and based on the one or more situational characteristics associated with the target vehicle.

Consistent with another disclosed embodiment, a host vehicle may include a body, at least one image capture device, and at least one processing device. The at least one processing device may be configured to receive a plurality of images from the at least one image capture device; identify, based on analysis of the plurality of images, at least one target vehicle in an environment of the host vehicle; determine, based on analysis of the plurality of images, one or more situational characteristics associated with the target vehicle; determine a current value associated with an altruistic behavior parameter; and determine based on the one or more situational characteristics associated with the target vehicle that no change in a navigation state of the host vehicle is required, but cause at least one navigational change in the host vehicle based on the current value associated with the altruistic behavior parameter and based on the one or more situational characteristics associated with the target vehicle.

Consistent with yet another disclosed embodiment, a method is provided for navigating a host vehicle. The method may include receiving a plurality of images from at least one image capture device associated with the vehicle; identifying, based on analysis of the plurality of images, at least one target vehicle in an environment of the host vehicle; determining, based on analysis of the plurality of images, one or more situational characteristics associated with the target vehicle; determining a current value associated with an altruistic behavior parameter; and determining based on the one or more situational characteristics associated with the target vehicle that no change in a navigation state of the host vehicle is required, but cause at least one navigational change in the host vehicle based on the current value associated with the altruistic behavior parameter and based on the one or more situational characteristics associated with the target vehicle.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
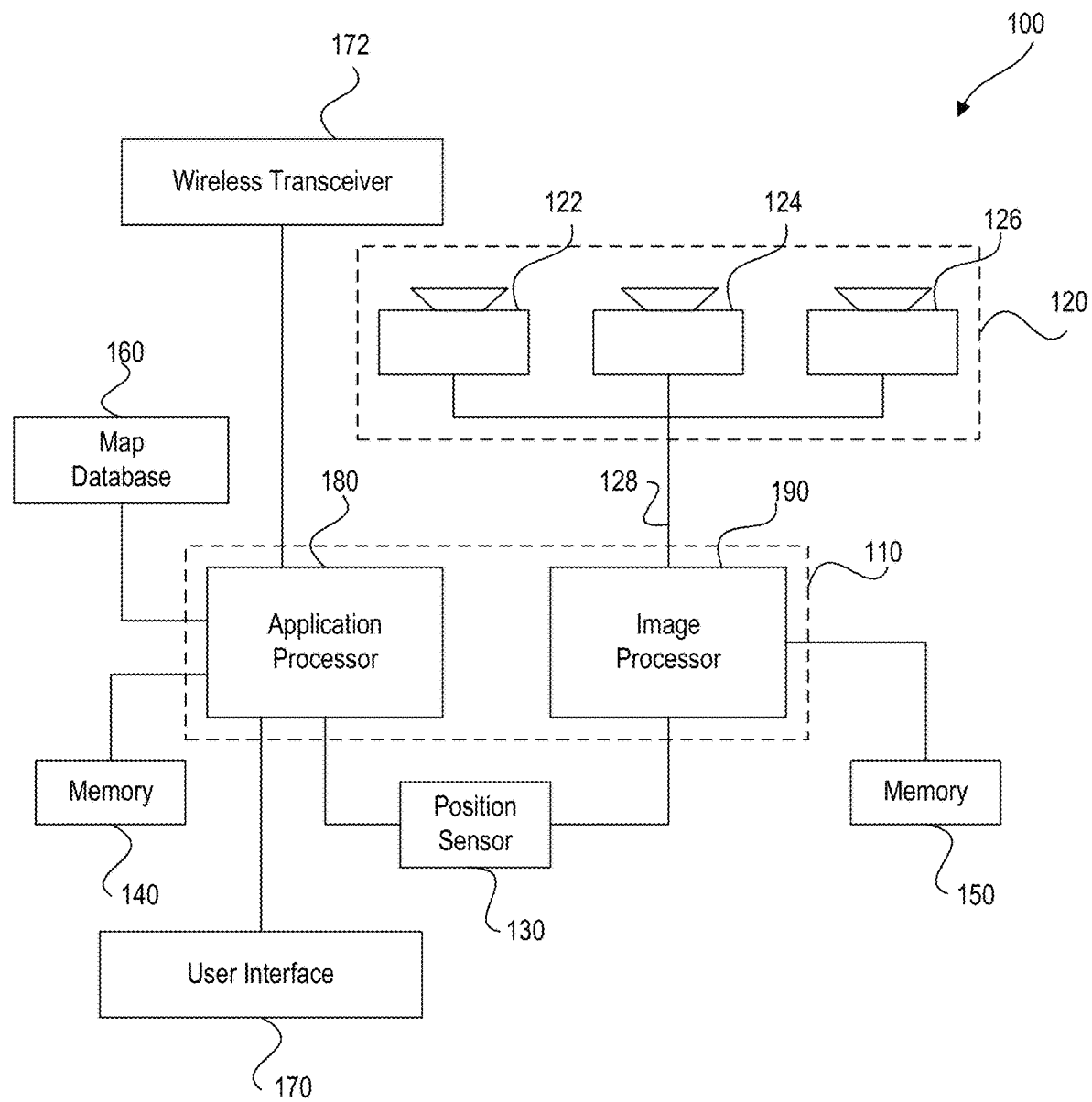
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations in order to control a vehicle, transportation infrastructures are built accordingly, with lane markings, traffic signs, and traffic lights all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while it is traveling, and the vehicle (as well as other vehicles) may use the information to localize itself on the model.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing unit 110 to image acquisition unit 120. For example, data interface 128 may include any wired and/or wireless link or links for transmitting image data acquired by image accusation unit 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.).

Both applications processor 180 and image processor 190 may include various types of processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer) for measuring a speed of vehicle 200 and/or an accelerometer for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.).

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
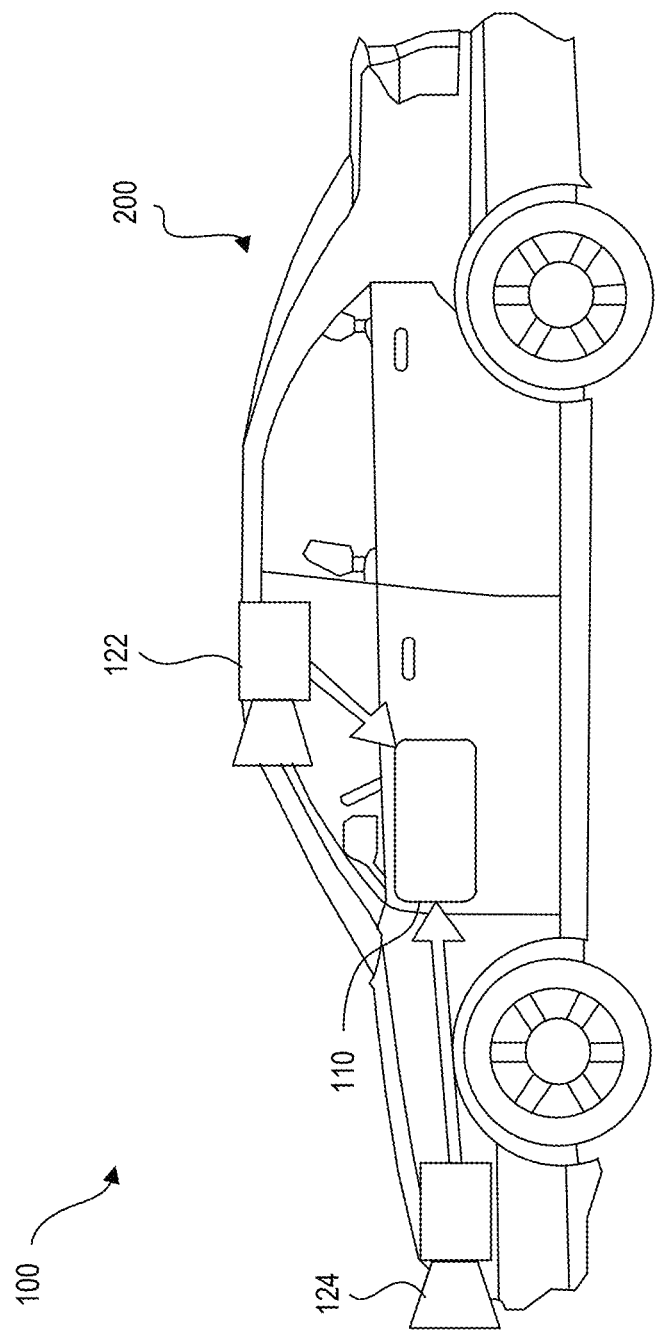
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light fixtures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on-demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead transmit data, such as captured images and/or limited location information related to a route.

Other privacy levels are contemplated as well. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
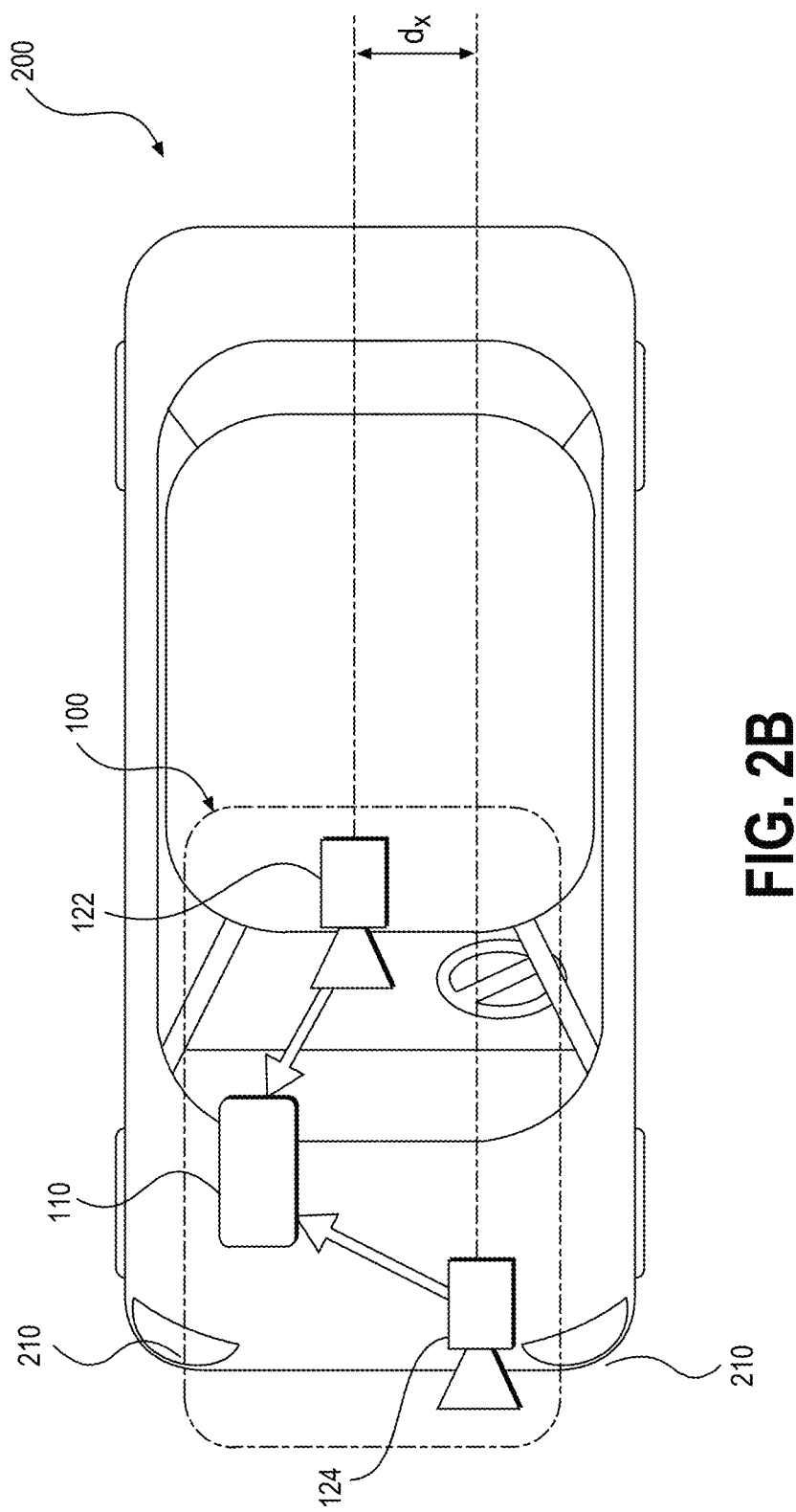
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
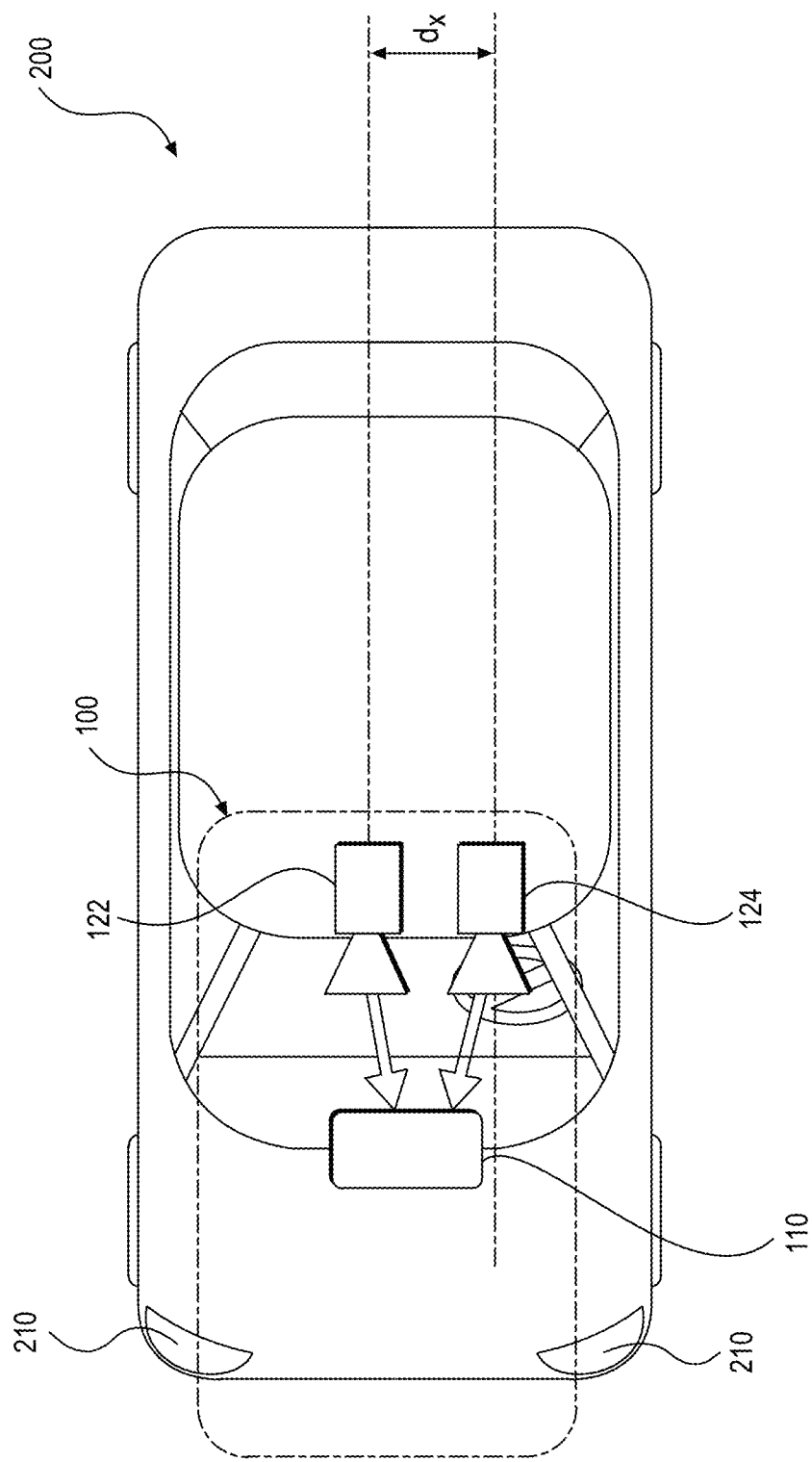
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
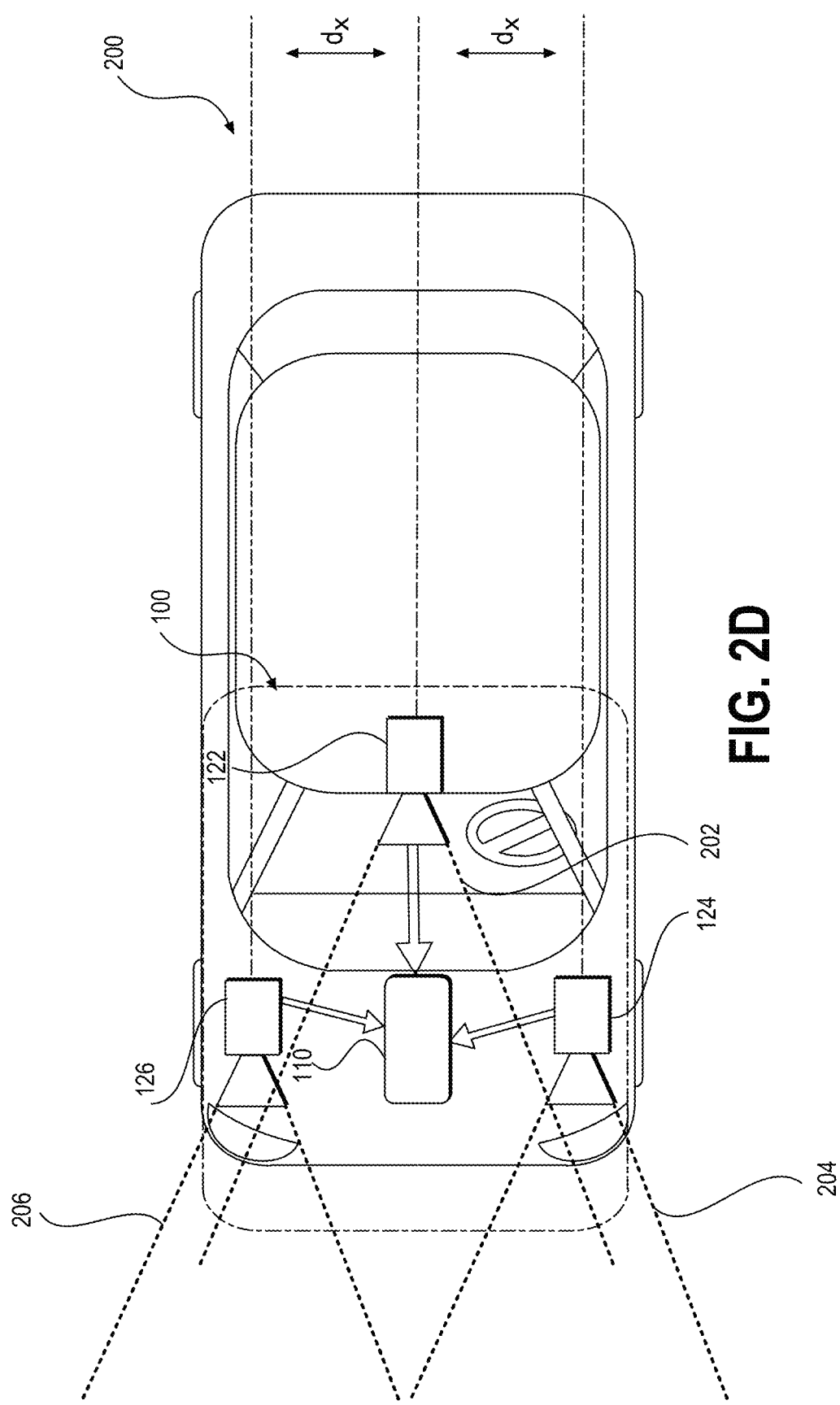
FIG. 2D is a diagrammatic top view representation of yet another embodiment of a vehicle including a system consistent with the disclosed embodiments.
Figure 2E:
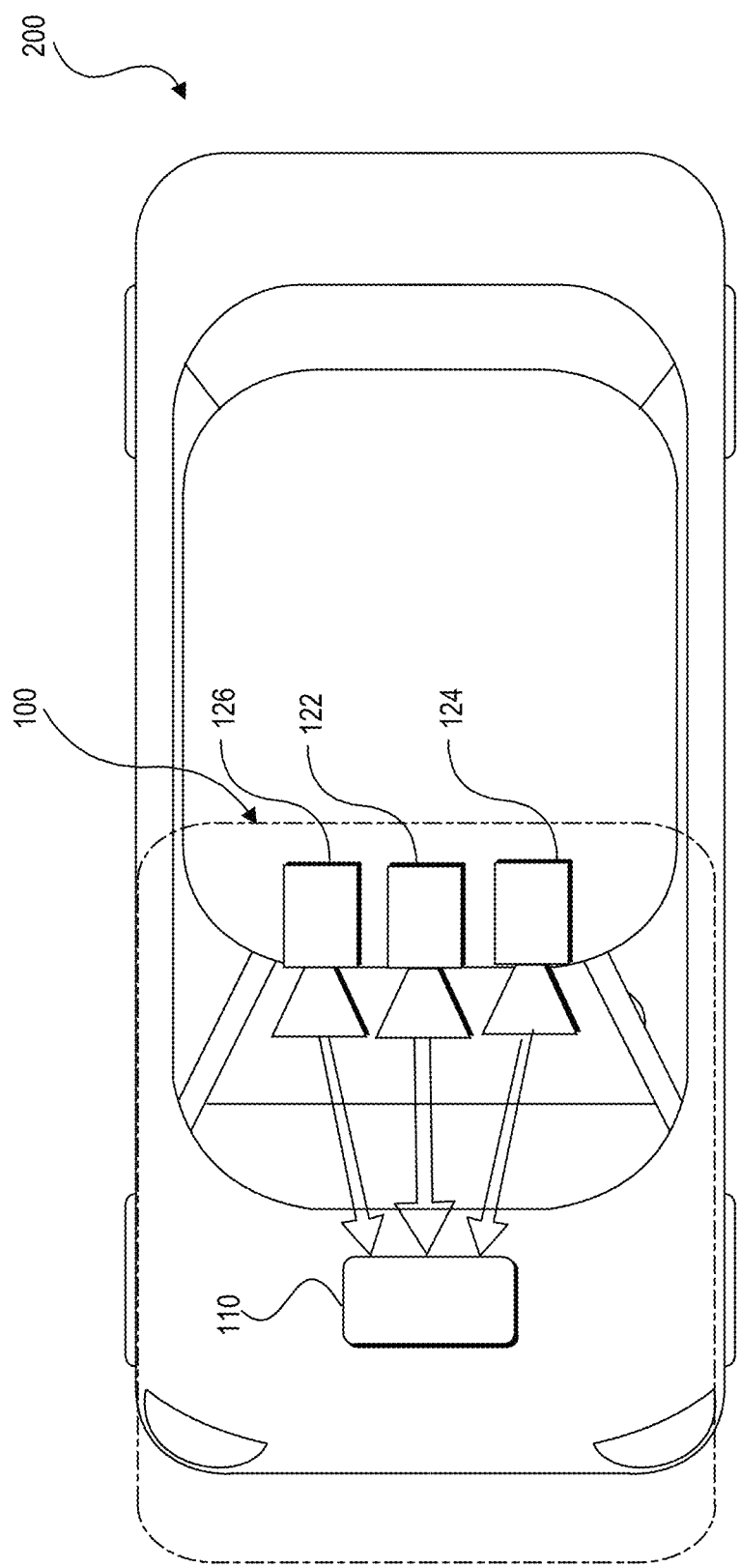
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by dx, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
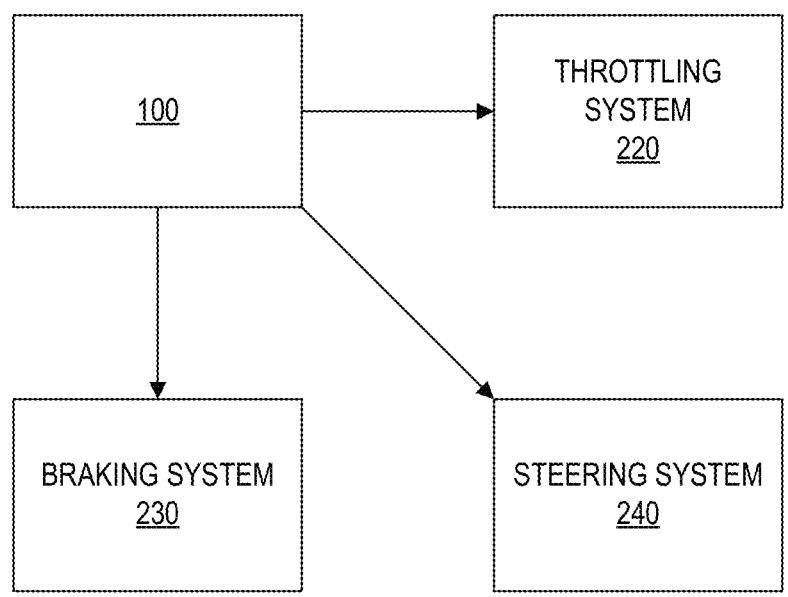
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
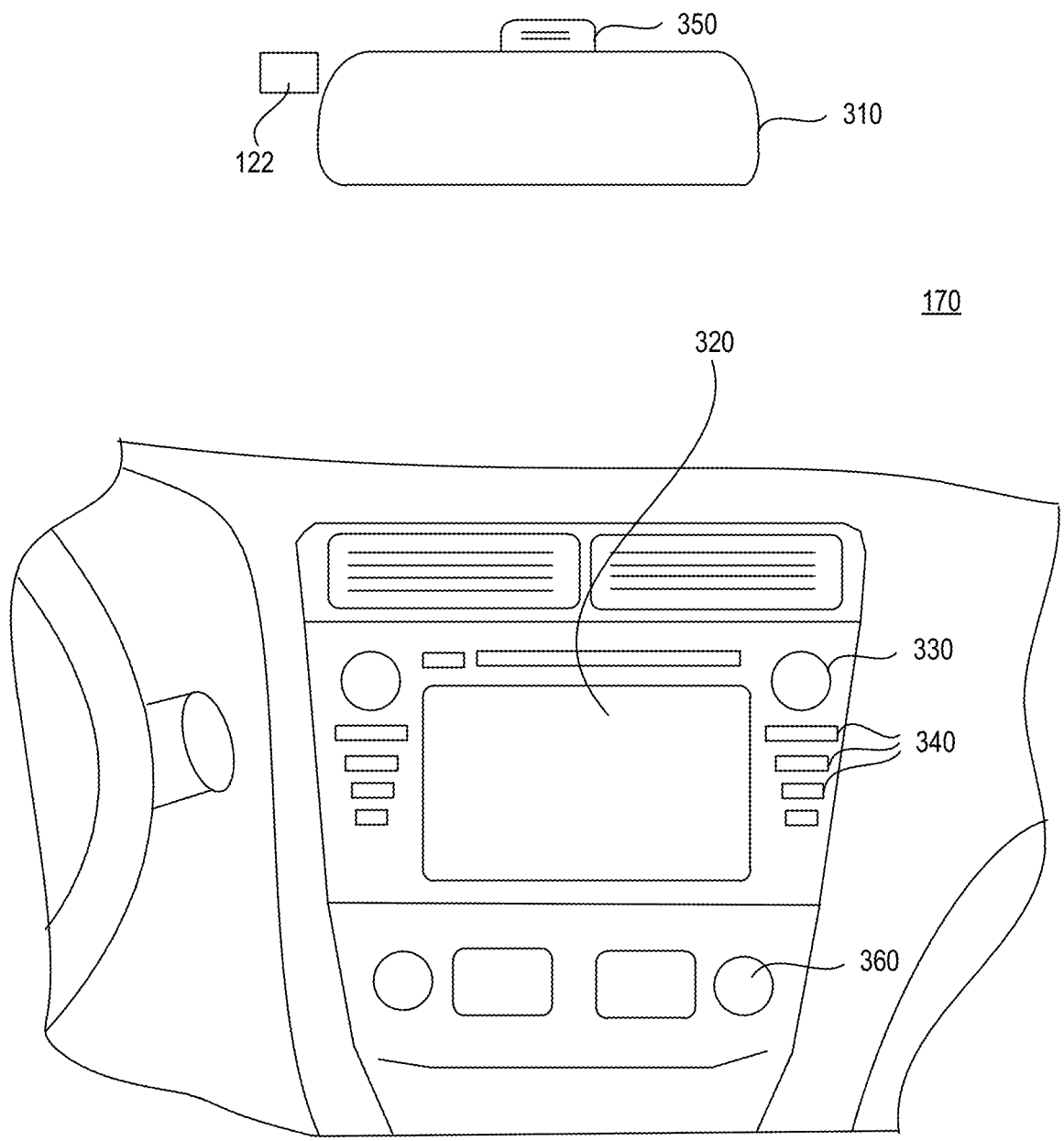
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
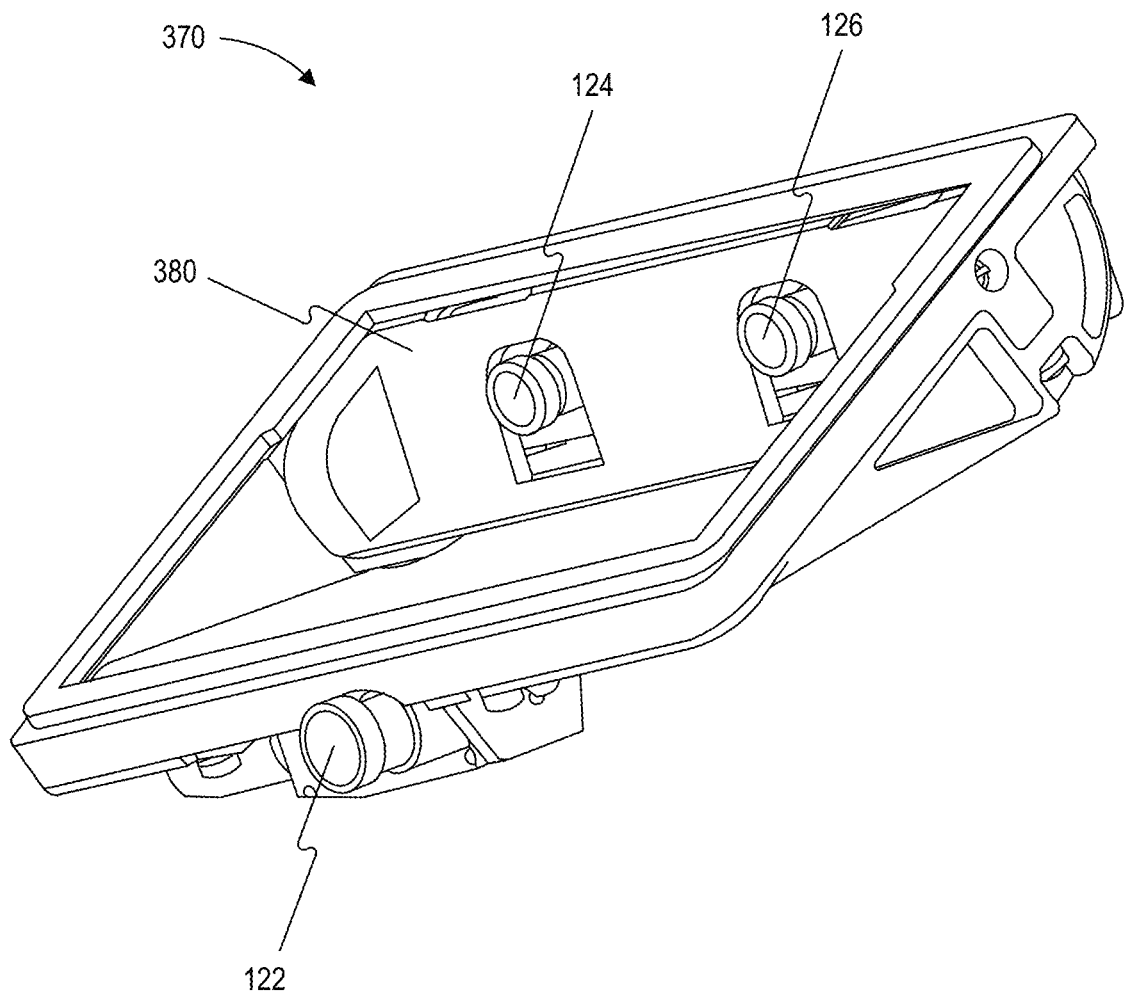
FIG. 3B is an illustration of an example of a camera mount that is configured to be positioned behind a rearview mirror and against a vehicle windshield consistent with the disclosed embodiments.
Figure 3C:
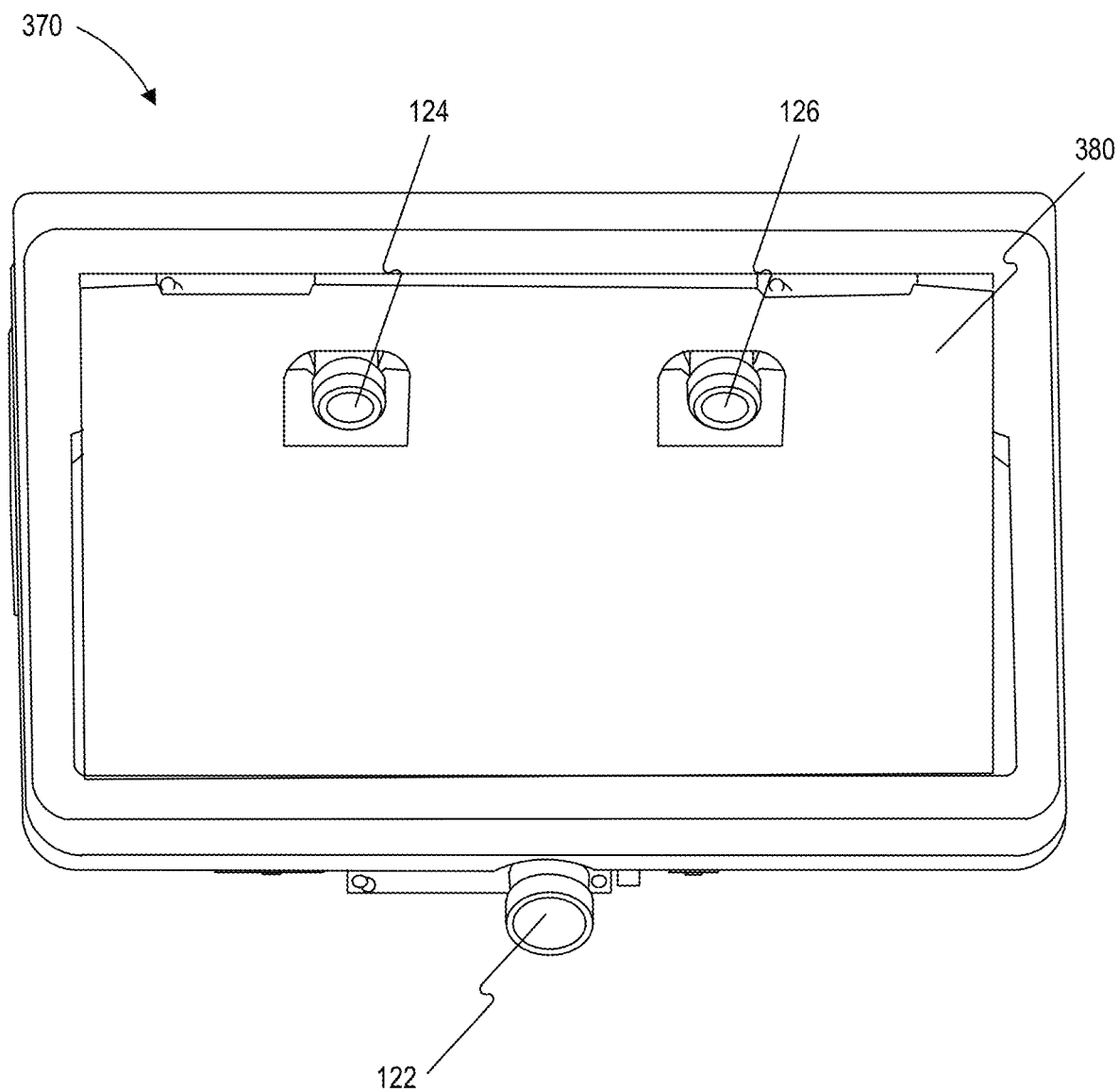
FIG. 3C is an illustration of the camera mount shown in FIG. 3B from a different perspective consistent with the disclosed embodiments.
Figure 3D:
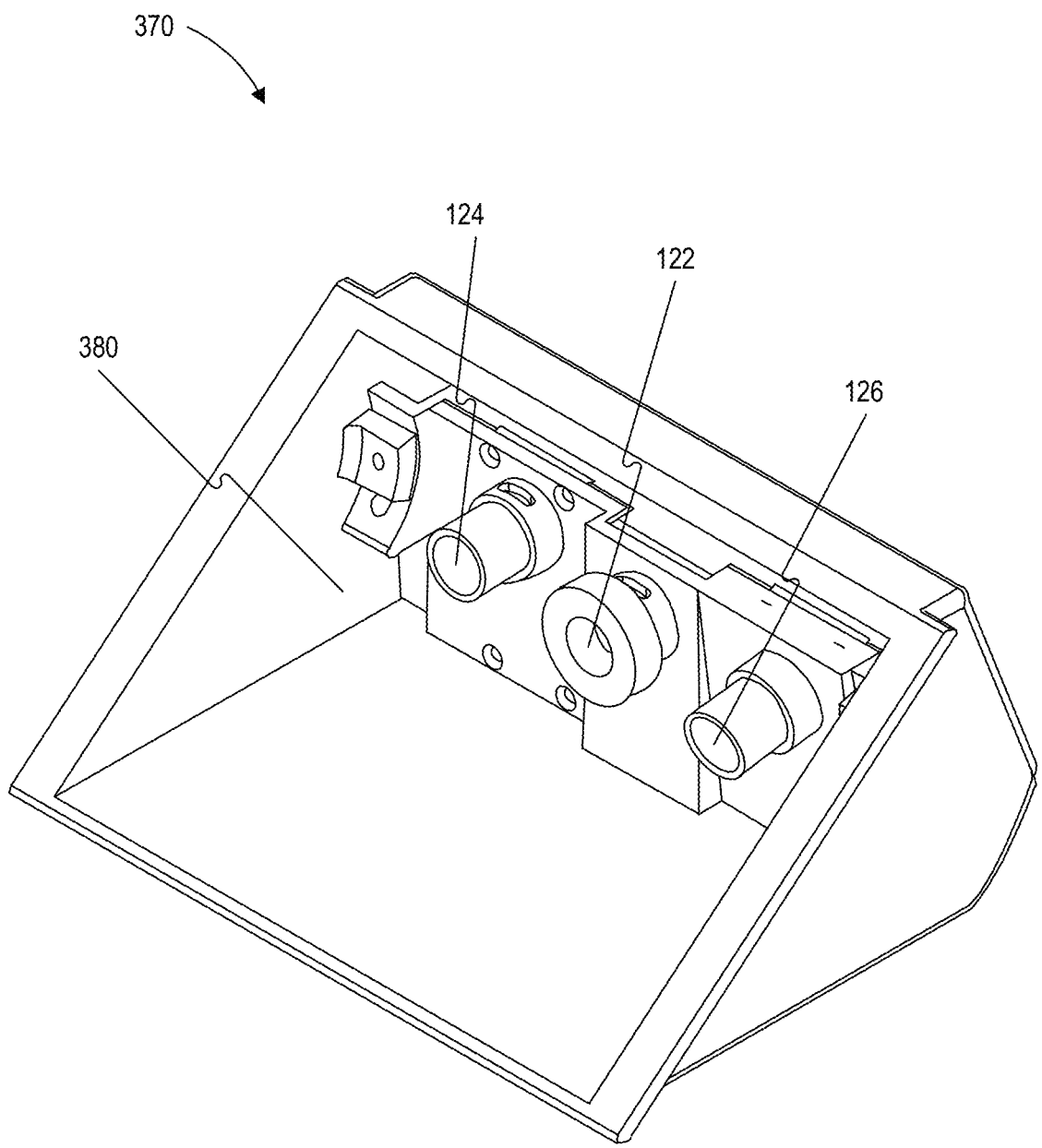
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from the main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
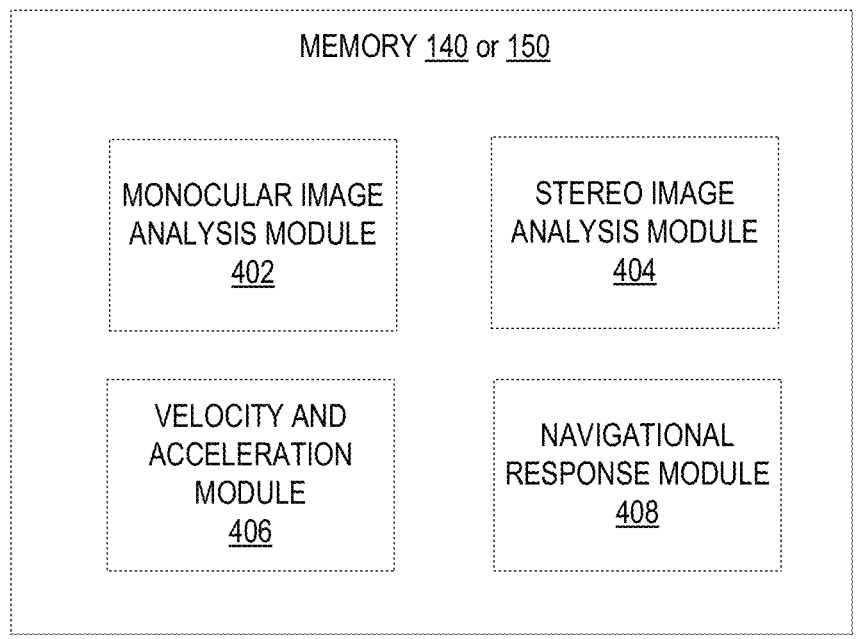
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, applications processor 180 and/or image processor 190 may execute the instructions stored in any of modules 402-408 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Figure 5A:
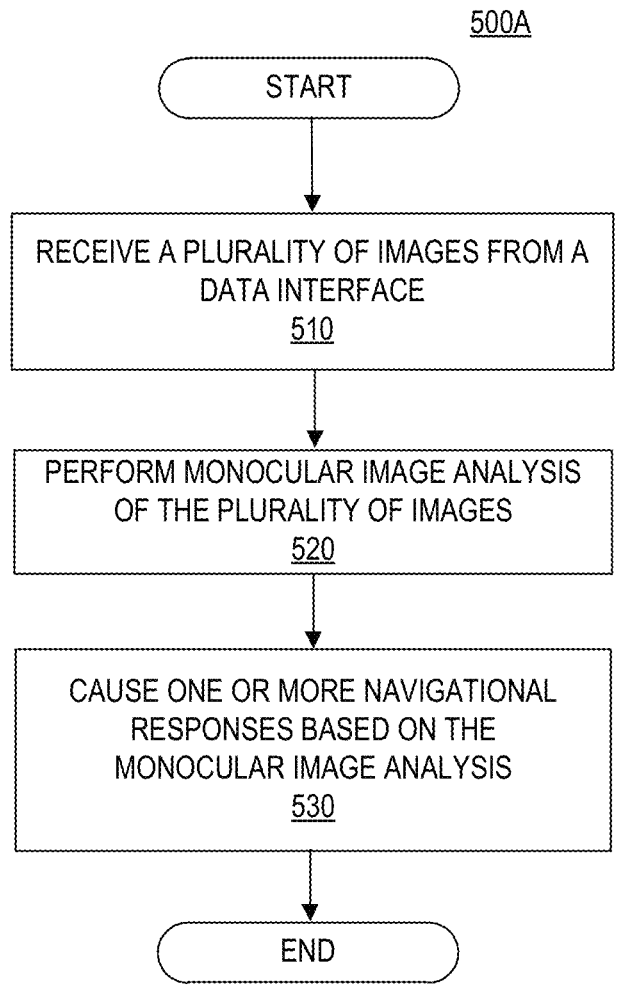
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
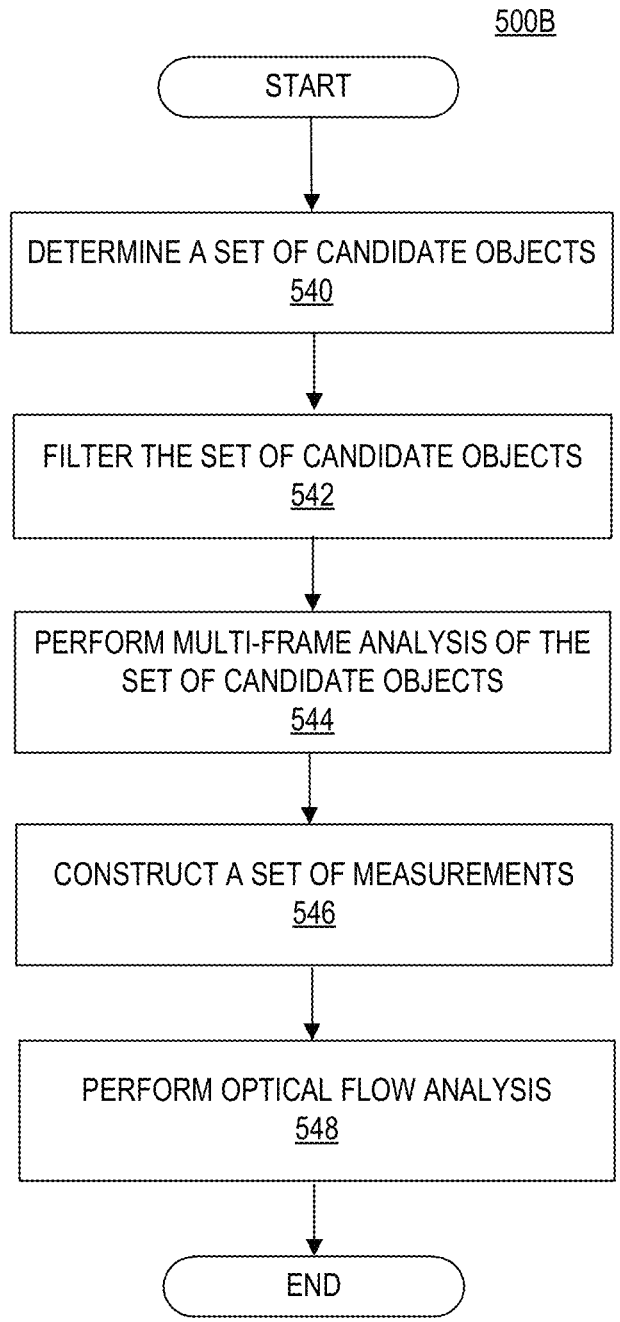
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
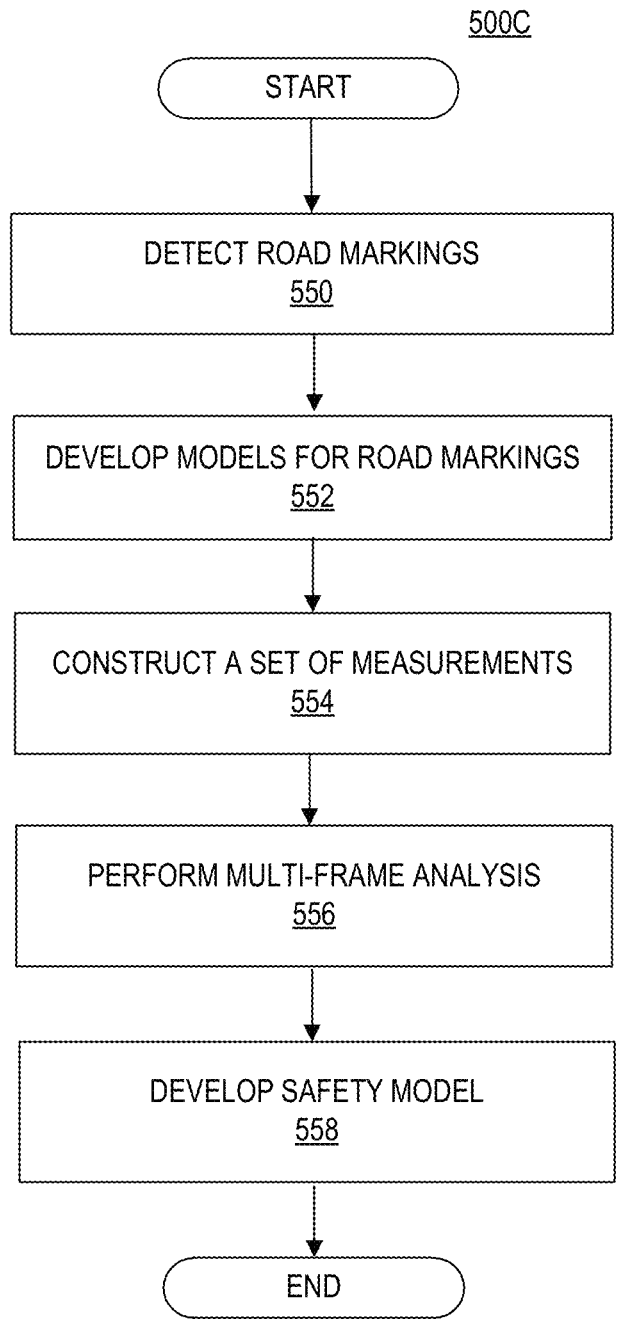
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
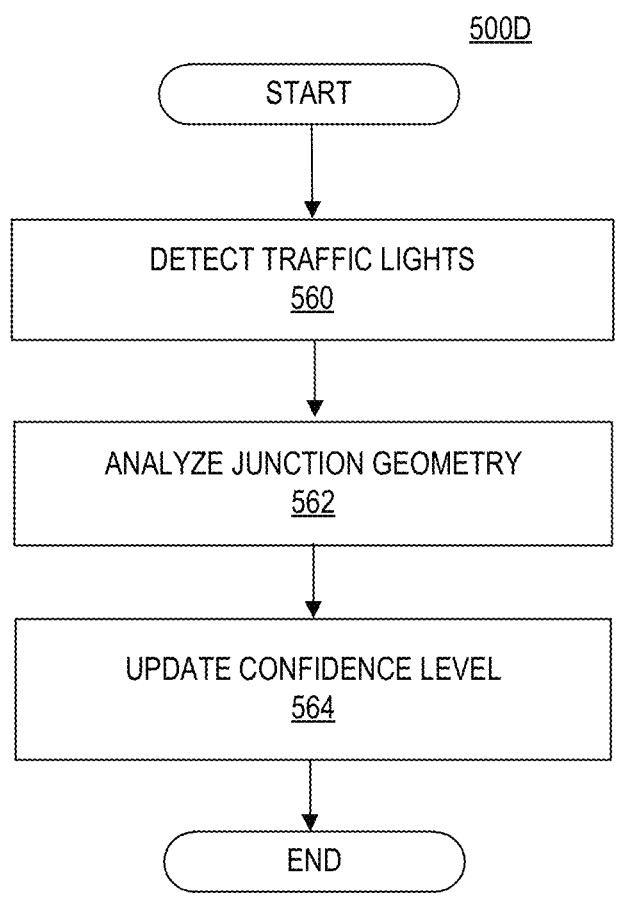
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
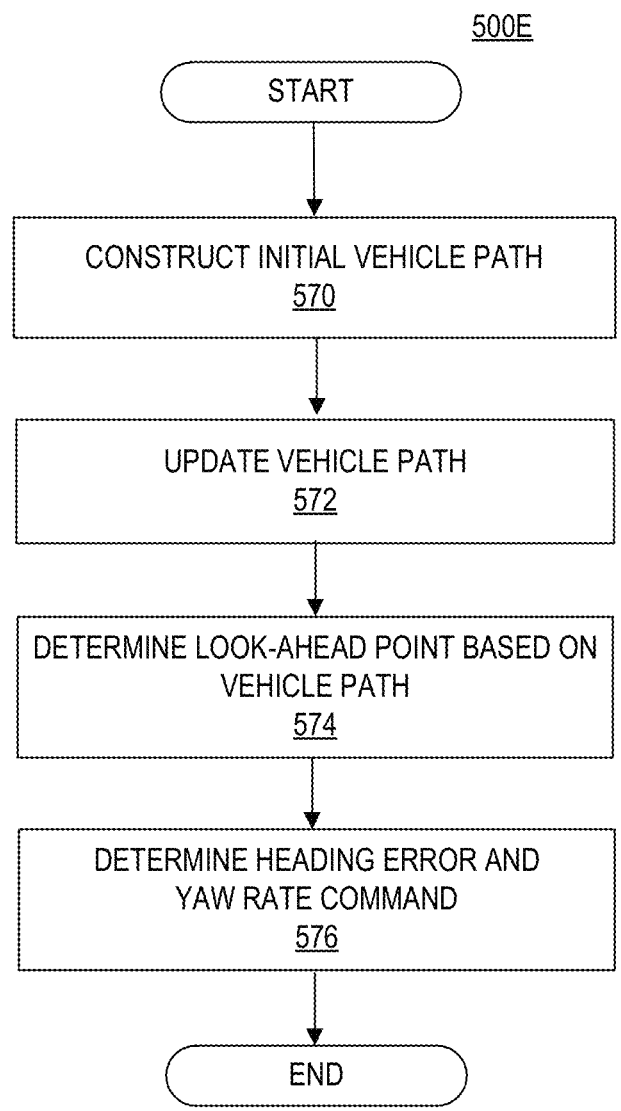
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., $\arctan(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
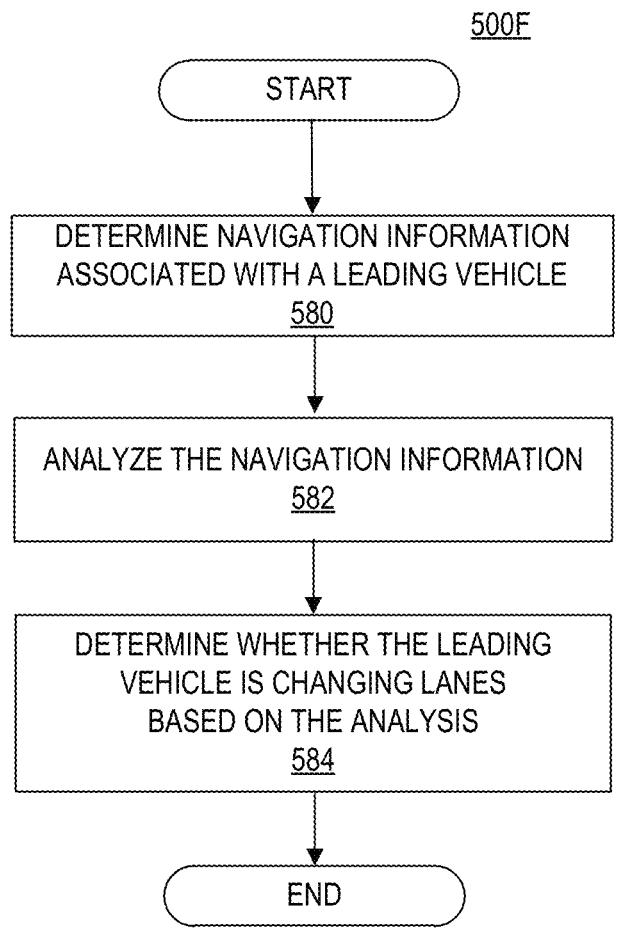
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
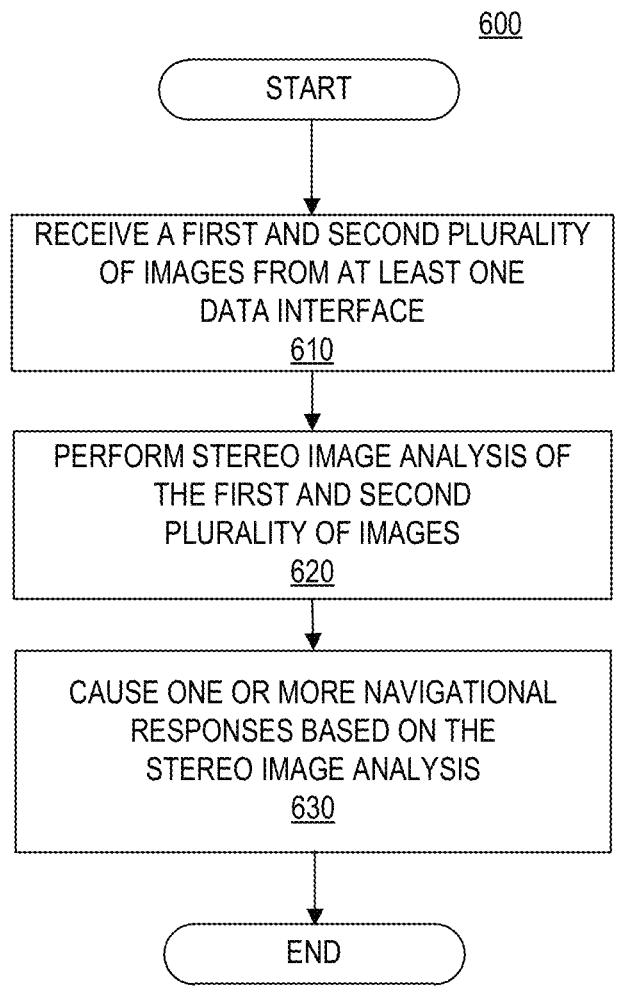
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing in the two image streams. For example, position, velocity, and/or acceleration relative to vehicle 200 may be determined based on trajectories, positions, movement characteristics, etc., of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
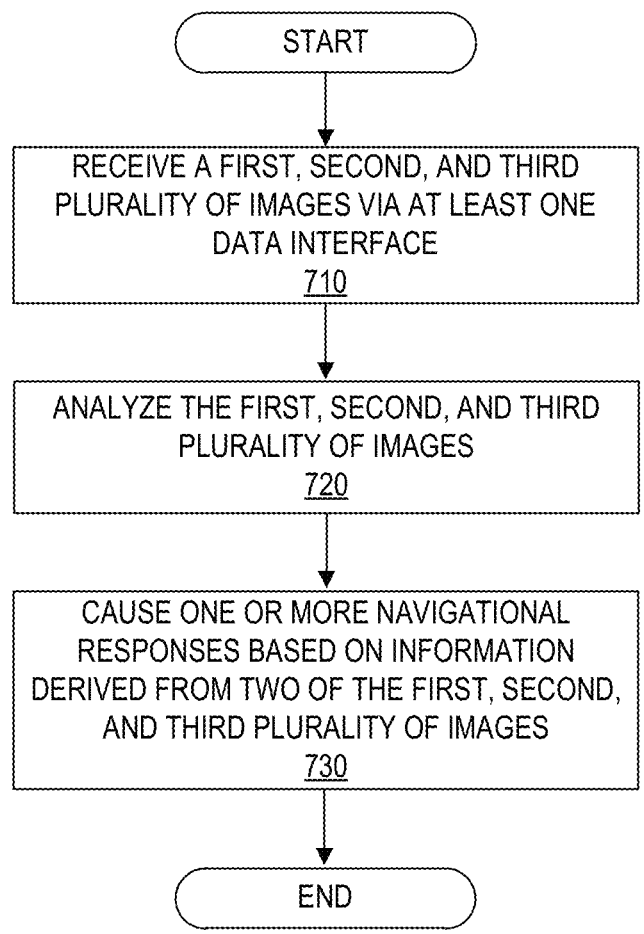
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126—including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Predicting Cut In Vehicles and Altruistic Behavioral Responses

During navigation, an autonomous vehicle, such as vehicle 200, may encounter another vehicle that is attempting a lane shift. For example, a vehicle in a lane (e.g., a lane designated by markings on a roadway or a lane aligned with the path of vehicle 200 without markings on the road) to the left or to the right of the lane in which vehicle 200 is traveling may attempt to shift, or cut in, to the lane in which vehicle 200 is traveling. Such a vehicle may be referred to as a target vehicle. When such a cut in occurs, vehicle 200 may need to make a navigational response. For example, vehicle 200 could change its velocity or acceleration and/or shift to another lane to avoid the cut-in by the target vehicle.

In some instances, the target vehicle may appear to attempt a cut in, but the cut in may ultimately not be completed. A driver of the target vehicle (or even a fully or partially autonomous navigational system associated with the target vehicle) may, for example, change his or her mind or otherwise change a navigational plan away from a lane change, or the target vehicle may simply have been drifting. Accordingly, in order to avoid frequent unnecessary braking and/or accelerations, it may be desirable for vehicle 200 to delay effecting a navigational response until a cut in by the target vehicle is determined to be sufficiently likely. On the other hand, in some situations (especially where a change in course of the target vehicle into the path of the host vehicle is expected), it may be desirable for vehicle 200 to effect a navigational response earlier. Such navigation based at least in part on expected behavior may help avoid sudden braking and may provide an even further increased safety margin. Improved prediction of when the target vehicle will attempt a cut in can help minimize both unnecessary braking and sudden braking. Such an improved prediction may be referred to as cut in detection, and the navigational responses taken when a cut in is detected may be referred to as a cut in response.

In some embodiments, such improved prediction may rely on monocular and/or stereo image analysis and/or information obtained from other sources (e.g., from a GPS device, a speed sensor, an accelerometer, a suspension sensor, etc.) to detect, for example, static road features (e.g., a lane ending, a roadway split), dynamic road features (e.g., the presence of other vehicles ahead of the vehicle likely to attempt a cut in), and/or traffic rules and driving customs in a geographic area. These static road features, dynamic road features, and/or traffic rules and driving customs may be referred to as predetermined cut in sensitivity change factors, and the presence of one or more predetermined cut in sensitivity change factors may cause vehicle 200 to modify its sensitivity to an attempted cut in by the target vehicle. For example, where a predetermined cut in sensitivity change factor is present in an environment (e.g., the target vehicle is closely trailing another vehicle moving at a lower speed), vehicle 200 may rely on a a first cut in sensitivity parameter, and where no predetermined cut in sensitivity change factor is present in the environment (e.g., the target vehicle is the only vehicle in its lane), vehicle 200 may rely on a second cut in sensitivity parameter. The second cut in sensitivity parameter may be different than (e.g., more sensitive than) the first cut in sensitivity parameter.

In some cases, a cut in by the target vehicle may be necessary. For example, the lane in which the target vehicle is traveling may be ending, the roadway may be splitting, or there may be an obstacle (e.g., a stopped vehicle, an object, or other type of blockage) in the lane in which the target vehicle is traveling. In other cases, though, a cut in by the target vehicle may be optional. For example, the target vehicle may attempt a cut in merely to pass a slower moving vehicle. When a cut in is optional, whether the target vehicle attempts the cut in may depend on how vehicle 200 (e.g., a host vehicle) behaves. For example, vehicle 200 may decelerate to signal that the target vehicle may cut in or may accelerate to signal that the target vehicle may not cut in. While accelerating may, in many cases, be desirable for vehicle 200, insofar as it allows vehicle 200 to reach a destination more quickly, an operator of vehicle 200 (or navigational system in full or partial control of vehicle 200) may be inclined to allow the cut in in some or all cases. This may be referred to as altruistic behavior. Thus, it may be desirable for vehicle 200 to take into account altruistic behavior considerations in determining whether to permit a cut in by a target vehicle.

Figure 8:
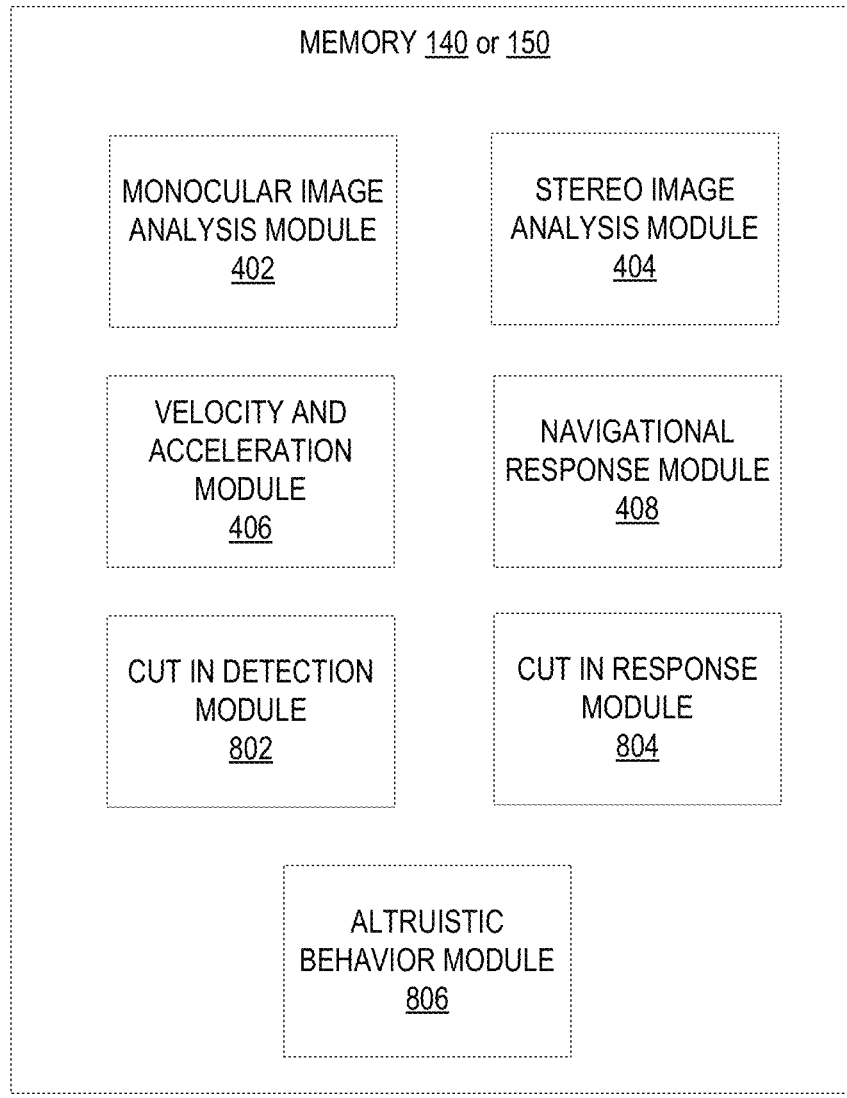
FIG. 8 is another exemplary functional block diagram of memory configured to store instructions for performing one or more operations consistent with the disclosed embodiments.

FIG. 8 is another exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150, and the instructions may be executed by processing unit 110 of system 100.

As shown in FIG. 8, memory 140 may store monocular image analysis module 402, stereo image analysis module 404, velocity and acceleration module 406, and navigational response module 408, which may take any of the forms of the modules described above in connection with FIG. 4.

Memory 140 may further store a cut in detection module 802, a cut in response module 804, and an altruistic behavior module 806. The disclosed embodiments are not limited to any particular configuration of memory 140. Further, applications processor 180 and/or image processor 190 may execute the instructions stored in any of modules 402-408 and 802-806 included in memory 140. One of skill in the art will understand that references in the following discussions to processing unit 110 may refer to applications processor 180 and image processor 190 individually or collectively. Accordingly, steps of any of the following processes may be performed by one or more processing devices. Further, any of modules 402-408 and 802-806 may be stored remotely from vehicle 200 (e.g., distributed over one or more servers in communication with a network and accessible over the network via wireless transceiver 172 of vehicle 200).

In some embodiments, cut in detection module 802 may store instructions that, when executed by processing unit 110, enable detection of a target vehicle. The target vehicle may be a vehicle traveling in a lane adjacent to the lane in which vehicle 200 is traveling and, in some cases, may be a leading vehicle. In some embodiments, cut in detection module 802 may detect the target vehicle by performing monocular image analysis of a set of images acquired by one of image capture devices 122, 124, and 126, as described above in connection with monocular image analysis module 402. In some embodiments, processing unit 110 may combine information from a set of images with additional sensory information (e.g., information from radar or lidar) to perform the monocular image analysis. As described in connection with FIGS. 5A-5D above, such monocular image analysis may involve detecting a set of features within the set of images, such as vehicle edge features, vehicle lights (or other elements associated with the vehicle), lane markings, vehicles, or, road signs. For example, detecting the target vehicle may be carried out as described in connection with FIG. 5B, including determining a set of candidate objects that includes the target vehicle, filtering the set of candidate objects, performing multi-frame analysis of the set of candidate objects, constructing a set of measurements for the detected objects (including the target vehicle), and performing optical flow analysis. The measurements may include, for example, position, velocity, and acceleration values (relative to vehicle 200) associated with the target vehicle.

Alternatively or additionally, in some embodiments cut in detection module 802 may detect the target vehicle by performing stereo image analysis of first and second sets of images acquired by a combination of image capture devices selected from any of image capture devices 122, 124, and 126, as described above in connection with stereo image analysis module 404. In some embodiments, processing unit 110 may combine information from the first and second sets of images with additional sensory information (e.g., information from radar or lidar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 above, stereo image analysis may involve detecting a set of features within the first and second sets of images, such as vehicle edge features, vehicle lights (or other elements associated with the vehicle), lane markings, vehicles, or, road signs.

In other embodiments, as an alternative to detecting one or more vehicles (e.g., the target vehicle) by analyzing images acquired by one of image capture devices 122, 124, and 126, cut in detection module 802 may instead detect a vehicle through analysis of sensory information, such as information acquired via a radar device or lidar device included in system 100.

In some embodiments, cut in detection module 802 may further store instructions that, when executed by processing unit 110, enable identification of an indicator that the target vehicle will attempt a cut in (that is, that the target vehicle will attempt to change lanes into the lane in which vehicle 200 is traveling or otherwise move into a travel path of the host vehicle). In some embodiments, identifying the indicator may involve using monocular and/or stereo image analysis to detect a position and/or speed of the target vehicle, as described above in connection with FIG. 5B. In some embodiments, identifying the indicator may further involve detecting one or more road markings, as described above in connection with FIG. 5C. And in some embodiments identifying the indicator may further involve detecting that the target vehicle is changing lanes, as described above in connection with FIG. 5F. In particular, processing unit 110 may determine navigation information associated with the target vehicle, such as position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above. Further, processing unit 110 may analyze the navigation information by, for example, calculating the distance between a snail trail and a road polynomial (e.g., along the trail) or comparing the leading vehicle's instantaneous position with the look-ahead point (associated with vehicle 200) over a specific period of time (e.g., 0.5 to 1.5 seconds), as described above in connection with FIG. 5F. Based on the analysis, the processing unit 110 may identify whether an indicator that the leading vehicle is attempting a cut in is present.

Cut in detection module 802 may further store instructions that, when executed by processing unit 110, enable detection that a predetermined cut in sensitivity change factor is present in the environment of vehicle 200. A predetermined cut in sensitivity change factor may include any indicator suggestive of a tendency of the target vehicle to remain on a current course or to change course into a path of the host vehicle. Such sensitivity change factors may include static road features (e.g., a lane ending, a roadway split, a barrier, an object), dynamic road features (e.g., the presence of other vehicles ahead of the vehicle likely to attempt a cut in), and/or traffic rules and driving customs in a geographic area. In some embodiments, detecting a predetermined cut in sensitivity change factor may involve using monocular and/or stereo image analysis to detect set of features within the set of images, such as lane markings, vehicles, pedestrians, road signs, highway exit ramps, traffic lights, hazardous objects, and any other feature associated with an environment of a vehicle as described above in connection with FIGS. 5A-5D and 6. Alternatively or additionally, in some embodiments detecting a predetermined cut in sensitivity change factor may involve using other sensory information, such as GPS data. For example, a lane ending, highway split, etc. may be determined based on map data. As another example, a traffic rule may be determined based on GPS location data.

Cut in response module 804 may store instructions that, when executed by processing unit 110, enable a cut in response to be effected. A cut in response may take any of the forms described above for a navigational response, such as a turn, a lane shift, a change in acceleration, and the like, as discussed below in connection with navigational response module 408.

In some embodiments, whether a cut in response is effected may depend on the presence of absence of a predetermined cut in sensitivity change factor in the environment. For example, where no predetermined cut in sensitivity change factor is present in an environment (e.g., the vehicle attempting a cut in is the only vehicle in its lane, no lane shifts or obstacles are detected either through image analysis or review of GPS/map/traffic data, etc.), vehicle 200 may rely on a first cut in sensitivity parameter. In some embodiments, where no predetermined cut in sensitivity change factor is present in an environment, vehicle 200 may rely on a value associated with the first cut in sensitivity parameter. The value may include any value directly tied to and/or measured with respect to the first cut in sensitivity parameter or may be one or more values indirectly related to the first cut in sensitivity parameter.

On the other hand, where one or more predetermined cut in sensitivity change factors are present in the environment (e.g., the target vehicle is moving at a high speed and is approaching another vehicle in its lane at a lower speed, a lane shift or lane end condition is detected either visually through image analysis or through reference to GPS/map/traffic information, the local region is one that discourages left lane driving, etc.), vehicle 200 may rely on a second cut in sensitivity parameter. The second cut in sensitivity parameter may be different than (e.g., more sensitive than) the first cut in sensitivity parameter. In some embodiments, where one or more predetermined cut in sensitivity change factors are present in the environment, vehicle 200 may rely on a value associated with the second cut in sensitivity parameter. Similar to the discussion above regarding the value associated with the first cut in sensitivity parameter, the value associated with the second cut in sensitive parameter may include any value directly tied to and/or measured with respect to the second cut in sensitivity parameter or may be one or more values indirectly related to the second cut in sensitivity parameter.

The first and second cut in sensitivity parameters may establish two states of operation: a first in which the host vehicle may be less sensitive to movements or course changes by a target vehicle, and a second state in which the host vehicle may be more sensitive to movements or course changes by a target vehicle. Such a state approach can reduce the number or degree of decelerations, accelerations, or course changes in the first state when a course change by the target vehicle is not expected based on any environmental conditions. In the second state, however, where at least one condition is detected or determined in the environment of the target vehicle that is expected to result in a course change (or other navigational response) of the target vehicle, the host vehicle can be more sensitive to course changes or navigational changes of the target vehicle and may alter course, accelerate, slow, etc. based on even small changes recognized in the navigation of the target vehicle. Such small changes, in the second state, may be interpreted as consistent with an expected navigational change by the target vehicle, and therefore, may warrant an earlier response, as compared to navigation within the first state.

It is further possible, that in the second state, course changes of the host vehicle may be made based on detection of the sensitivity change factor alone and without detection of a navigational response or change in the target vehicle. For example, where image analysis in the host vehicle system indicates that a sensitivity change factor exists (e.g., by recognizing in the captured images a road sign indicative of a lane end condition, recognizing in the images a lane end ahead of the target vehicle, recognizing an object ahead of the target vehicle or a slower moving vehicle, or any other sensitivity change factor), the host vehicle may take one or more preemptive actions (slow, accelerate, change course, etc.) even without detecting a navigational change by the target vehicle. Such a change may be warranted based on the expectation that the target vehicle will need to make a navigational change in the future. Such a change may increase or maximize an amount of time between the host vehicle navigational change and the expected target vehicle navigational change.

A cut in sensitivity parameter may take the form of a threshold (e.g., a threshold distance between a snail trail and a road polynomial (e.g., along the trail) or between the target vehicle's instantaneous position with a look-ahead point (associated with vehicle 200) over a specific period of time (e.g., 0.5 to 1.5 seconds), a combination of such thresholds (e.g., a threshold lateral speed of the target vehicle in combination with a threshold lateral position of the vehicle relative to vehicle 200), and/or a weighted average of such thresholds, as described above in connection with FIG. 5F. As discussed above, in some embodiments, the cut in sensitivity parameter may also be any arbitrarily assigned variable for which a value is associated with the parameter or any value indirectly related to the value of the parameter may be used to create the two (or more) sensitivity states described above. For example, such a variable may be associated with a first value indicative of a low sensitivity state where no sensitivity change factor is detected, and may be associated with a second value indicative of a higher sensitivity state where a sensitivity change factor is found in the environment of the target vehicle.

In some embodiments, cut in response module 804 may evaluate a distance from vehicle 200 to a vehicle traveling behind vehicle 200 and factor that distance into a cut sensitivity parameter. For example, vehicle 200 may include one or more rear facing sensors (e.g., a radar sensor) to determine a distance from vehicle 200 to a vehicle traveling behind vehicle 200. Still further, in some embodiments, vehicle 200 may include one more rear facing cameras that provide images to system 100 for analysis to determine a distance from vehicle 200 to a vehicle traveling behind vehicle 200. In still other embodiments, system 100 may use data from one or more sensors and one or more rear facing cameras to determine a distance from vehicle 200 to a vehicle traveling behind vehicle 200. Based on the distance from vehicle 200, cut in response module 804 may evaluate whether or not decelerating is safe for vehicle 200 based on the distance between vehicle 200 and the vehicle traveling behind vehicle 200.

Alternatively or additionally, the cut in sensitivity parameters may be derived from examples using machine learning techniques such as neural networks. For example, a neural network may be trained to determine cut in sensitivity parameters based on scenarios. As an example, the neural network could be trained for a scenario in which a roadway includes three lanes of travel, vehicle 200 is in the center lane, there is a leading vehicle in the center lane, two vehicles are in the left lane, and one vehicle is in the right lane. The scenario could specify to the neural network a longitudinal position, longitudinal speed, lateral position, and lateral speed of each of the vehicles. Based on the scenario, the neural network may determine, for instance, a binary output (e.g., whether a target vehicle will attempt a cut in in the next N frames) or a value output (e.g., how long until the target vehicle attempts to cut in to the center lane). The binary or value output, or another value derived from these outputs, may be used as the cut in sensitivity parameter. The neural network may be similarly trained for other scenarios, such as scenarios in which the roadway includes only two lanes of travel, there is no leading vehicle in the center lane, or there is no vehicle in the right lane. In some embodiments, the neural network may be provided via one or more programming modules stored in memory 140 and/or 150. In still embodiments, in addition to or as an alternative to memory 140 and/or 150, the neural network (or aspects of the neural network) may be provided via one or more servers located remotely from vehicle 200 and accessible over a network via wireless transceiver 172.

In some embodiments, to minimize the number of scenarios, the scenarios may be grouped according to the number of lanes in the roadway and the location of vehicle 200. For example, the scenarios may include a scenario having two lanes in which vehicle 200 is in the left lane, a scenario having two lanes in which vehicle 200 is in the right lane, a scenario having three lanes in which vehicle 200 is in the left lane, a scenario having three lanes for which vehicle 200 is in the center lane, a scenario having three lanes for which vehicle 200 is in the right lane, a scenario having four lanes in which vehicle 200 is in the leftmost lane, a scenario having four lanes in which vehicle 200 is in the center left lane, etc. In each scenario, a leading vehicle may be traveling in the same lane as vehicle 200 and two vehicles may be traveling in each of the other lanes. To account for scenarios in which one or more of these other vehicles is absent (e.g., there is no leading vehicle, there is only one vehicle in the right lane, etc.), the longitudinal distance of the absent vehicle may be set to infinity.

Once vehicle 200 has detected the target vehicle (e.g., has identified an indicator that the target vehicle is attempting a cut in), and detected whether any cut in sensitivity change factor is present in the environment, as described above, cut in response module 804 may provide the target vehicle, indicator, and/or (if present) the sensitivity change factor(s) to the neural network, and the neural network may select the scenario that most closely resembles the situation of vehicle 200. Based on the selected scenario, the neural network may indicate a binary output (e.g., whether a target vehicle will attempt a cut in in the next N frames) or a value output (e.g., how long until the target vehicle attempts to cut in to the center lane), as described above, from which a cut in sensitivity parameter may be derived. Based on the cut in sensitivity parameter, cut in response module 804 enable a cut in response to be effected.

As noted above, a cut in response may take any of the forms described above for a navigational response, such as a turn, a lane shift, and/or a change in acceleration, and the like, as discussed above in connection with navigational response module 408. In some embodiments, processing unit 110 may use data derived from execution of velocity and acceleration module 406, described above, to cause the one or more cut in responses. Additionally, multiple cut in responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200. In some embodiments, cut in response module 804 may analyze images acquired by one of image capture devices 122, 124, and 126 to detect whether any cut in sensitivity change factor is present in the environment of vehicle 200. In other embodiments, in addition to or as an alternative to analyzing images, cut in response module 804 may detect whether any cut in sensitivity change factor is present in the environment of vehicle 200 through analysis of sensory information, such as information acquired via a radar device or lidar device included in system 100.

In some embodiments, the neural networks described above may be further configured to determine the cut in response as well. For example, the neural networks may determine and output, based on the detected target vehicle, indicator, and/or (if present) the sensitivity change factor(s), indicating what navigational response should be effected. In some embodiments, such an output may be determined based on previously detected driver behavior. In some embodiments, previously detected driver behavior may be filtered using a cost function analysis that preferences smooth driving behavior (e.g., smooth driving behavior can be measured as that which minimizes the square of the deceleration or acceleration integration over a period of time).

Cut in detection module 802 and cut in response module 804 are further described below in connection with FIGS. 9A-9E and 11.

Altruistic behavior module 806 may store instructions that, when executed by processing unit 110, taken into account altruistic behavior considerations to determine whether vehicle 200 should permit a target vehicle to cut into the lane in which vehicle 200 is traveling. To this end, processing unit 110 may detect the target vehicle in any of the manners described above in connection with cut in detection module 802.

Further, processing unit 110 may determine one or more situational characteristics associated with the target vehicle. A situational characteristic may be, for example, any characteristic that indicates the target vehicle would benefit from changing lanes into the lane in which vehicle 200 is traveling. For example, a situational characteristic may indicate that the target vehicle is traveling in a lane adjacent to the lane in which vehicle 200 is traveling and that the target vehicle is behind another vehicle that is traveling more slowly than the target vehicle. In general, the situational characteristic may indicate that, while a cut in or other navigational response by the target vehicle may not be necessary, a cut in would benefit the target vehicle. Other such situations may occur, for example, in traffic jams, at crowded roundabouts, at lane end situations, or any other conditions where a target vehicle may desire to move into a path of a host vehicle.

In some embodiments, detecting the situational characteristic(s) may involve using monocular and/or stereo image analysis to detect a set of features within a set of images, such as lane markings, vehicles, pedestrians, road signs, highway exit ramps, traffic lights, hazardous objects, and any other feature associated with an environment of a vehicle as described above in connection with FIGS. 5A-5D and 6. For example, identifying the situational characteristic(s) may involve using monocular and/or stereo image analysis to detect a position and/or speed of the target vehicle and/or one or more other vehicles, as described above in connection with FIG. 5B. In some embodiments, identifying the situational characteristic(s) may further involve detecting one or more road markings, as described above in connection with FIG. 5C. Alternatively or additionally, in some embodiments detecting the situational characteristic(s) may involve using other sensory information, such as GPS data. For example, an entrance ramp in the roadway may be determined based on map data. In some situations, detecting the situational characteristic may involve determining from captured images a location of a target vehicle relative to other vehicles and/or a number of vehicles in a vicinity of the target vehicle, etc. In still other embodiments, detecting the situational characteristic(s) may involve using other sensory information, such as information acquired via a radar device or lidar device included in system 100.

Altruistic behavior module 806 may further store instructions that, when executed by processing unit 110, determine whether to cause a navigational change (e.g., any of the navigational responses described above) that would permit the target vehicle to cut into the lane in which vehicle 200 is traveling. Such a determination may be made based on an altruistic behavior parameter.

The altruistic behavior parameter may, for example, be set based on input from an operator of vehicle 200. For instance, the operator may set the altruistic behavior parameter to allow all target vehicles to cut into the lane in which vehicle 200 is traveling, to allow only one of every n target vehicles to cut in to the lane in which vehicle 200 is traveling, to allow a target vehicle to cut into the lane in which vehicle 200 is traveling only when another vehicle ahead of the target vehicle is traveling below a certain speed, etc. Alternatively or additionally, in some embodiments the altruistic behavior parameter may be user-selectable (e.g., a user-selectable value or state) before or during navigation. For example, a user may select (e.g., through user interface 170), upon entering vehicle 200, whether to be altruistic or not during navigation. As another example, the user may select (e.g., through user interface 170), when one or more situational characteristics are detected, whether to be altruistic or not in that instance.

In some embodiments, the altruistic behavior parameter may be set based on at least one informational element determined by parsing calendar entries for an operator or a passenger of vehicle 200. For example, in some embodiments the altruistic behavior parameter may indicate that a target vehicle should be allowed to cut into the lane in which vehicle 200 is traveling so long as vehicle 200 will reach a destination within a time frame that is acceptable to an operator of vehicle 200. For instance, when the operator or a passenger is not in a hurry, the criteria may allow more target vehicles to cut in, but when the operator or passenger is in a hurry, the criteria may allow fewer target vehicles to cut in or may not allow any target vehicles to cut in at all. Whether an operator or passenger is in a hurry may be determined by the processing unit 110 based on, for instance, calendar entries associated with the operator or passenger (e.g., a calendar event indicating that the user wishes to arrive at a certain location by a certain time) and navigational data for vehicle 200 (e.g., GPS and/or map data estimating an arrival time at the location).

In some embodiments, the altruistic behavior parameter may be set based on an output of a randomizer function. For instance, certain outputs of the randomizer function may cause vehicle 200 to allow the target vehicle 1002 to cut in to the first lane 1004, while other outputs of the randomizer function may cause vehicle 200 to not allow the target vehicle 1002 to cut into the first lane 1004. Still alternatively or additionally, the altruistic behavior parameter may be set based on a determined number of encounters with target vehicles for which the one or more situational characteristics indicate that the target vehicle would benefit from a course change into the first lane 1004.

In some embodiments, the altruistic behavior parameter may be fixed. Alternatively, the altruistic behavior parameter may be updated such that a navigational change in vehicle 200 is caused in at least a predetermined percentage of encounters with target vehicles for which the one or more situational characteristics indicate that the target vehicle would benefit from a course change into a path of vehicle 200. For example, the predetermined percentage may be, e.g., at least 10%, at least 20%, at least 30%, etc.

In some embodiments, the altruistic behavior parameter may specify rules, such that a navigational change should be effected if certain criteria are met. For instance, a predetermined altruistic behavior parameter may indicate that, if vehicle 200 is approaching a target vehicle in an adjacent lane and the target vehicle is traveling behind another vehicle that is moving more slowly than the target vehicle, vehicle 200 should decelerate to permit the target vehicle to cut in so long as: the target vehicle has indicated a desire to cut in (e.g., through the use of a blinker or through lateral movement towards the lane in which vehicle 200 is traveling), the deceleration of vehicle 200 is below a certain threshold (e.g., to avoid braking too rapidly), and there is no vehicle behind vehicle 200 that would make deceleration unsafe.

In some embodiments, the altruistic behavior parameter may be designed to be inconsistent, such that the same situational characteristic(s) and criteria may result in different navigational changes or no navigational changes at all. For instance, the altruistic behavior parameter may result in altruism variations that are random and/or cyclical. As an example, the altruistic behavior parameter may permit only one in every n target vehicles to cut in. In some embodiments, n may be randomly selected, may vary randomly, may increase each time situational characteristic(s) are detected, and/or may be reset to a low value when a cut in is permitted. As another example, the altruistic behavior parameter may determine whether or not to permit the target vehicle to cut in based on comparison of a randomly generated number to a predetermined threshold.

In some embodiments, altruistic behavior module 804 may consider how many vehicles are traveling behind vehicle 200 and factor that information into the altruistic behavior parameter. For example, vehicle 200 may include one or more rear facing sensors (e.g., a radar sensor) to detect trailing vehicles and/or one more rear facing cameras that provide images to system 100 for analysis and/or traffic information over wireless connection. Based on the number of vehicles traveling behind vehicle 200, altruistic behavior module 804 may then evaluate a potential impact of whether or not vehicle 200 permits the target vehicle to cut in. For example, if a long line of vehicles (e.g., 5, 10, or more vehicles) are determined to be traveling behind vehicle 200, if vehicle 200 does not allow the target vehicle to cut in, it is potentially unlikely that the target vehicle will have an opportunity to cut in until the trailing vehicles have passed, which may take a significant amount of time. However, if a small number of vehicles (e.g., 1 or 2) are traveling behind vehicle 200, if vehicle 200 does not allow the target vehicle to cut in, the target vehicle will have an opportunity to cut in after a short period of time (e.g., after the small number of vehicles has passed).

In some embodiments, the altruistic behavior parameter may be derived from examples using machine learning techniques such as neural networks. For example, a neural network could be trained to determine altruistic behavior parameters based on scenarios, as described above. In some embodiments, the altruistic behavior parameters may be determined based on previously detected driver behavior. For example, altruistic behavior by drivers can be positively weighted, causing the neural networks to preference altruistic behavior. Inconsistency, as described above, can be added through random or cyclical variation as described above.

Altruistic behavior module 806 is further described below in connection with FIGS. 10 and 12.

Figure 9A:
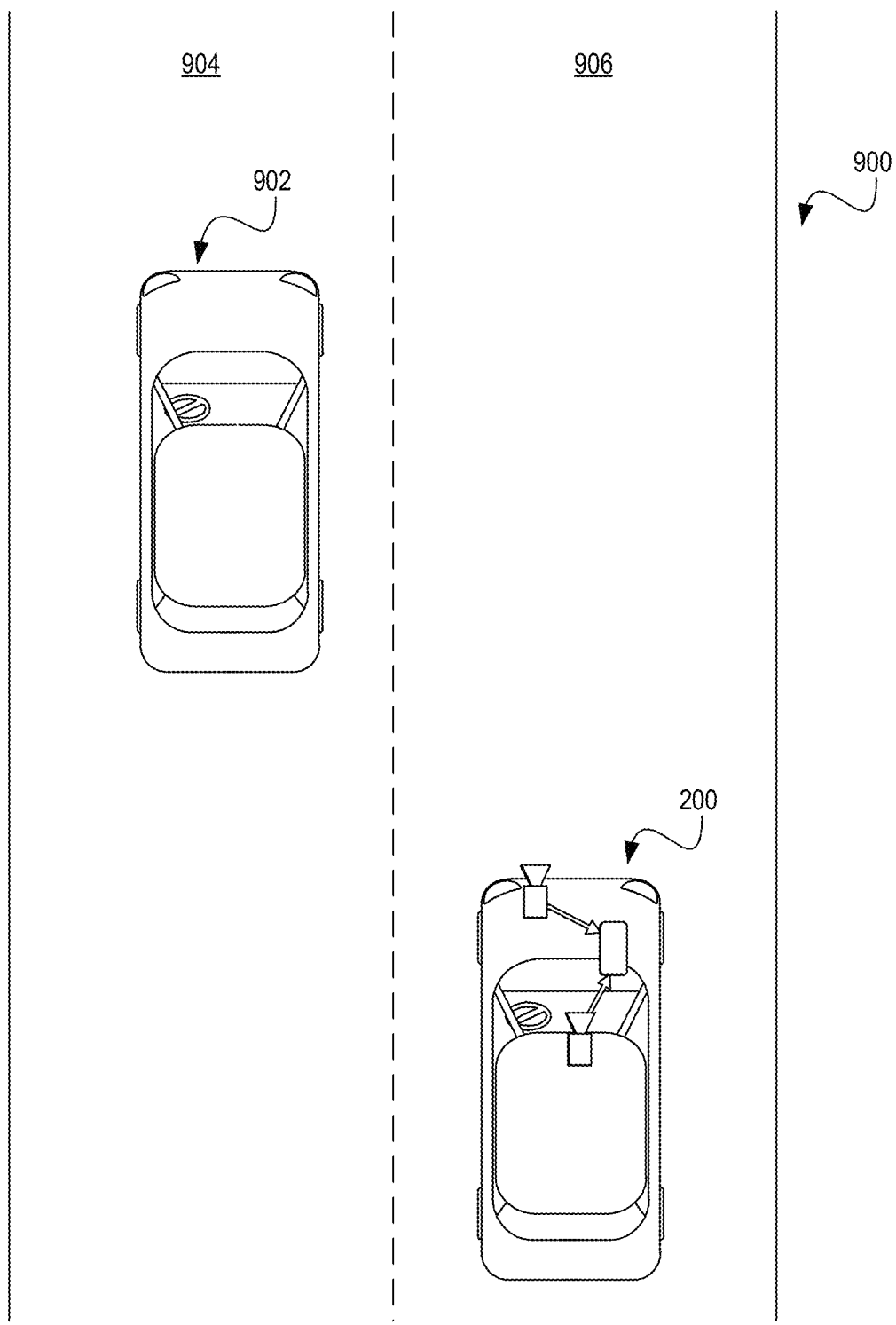
FIG. 9A is an illustration of an example situation in which a vehicle may detect and respond to a cut in, consistent with the disclosed embodiments.

FIG. 9A is an illustration of an example situation in which vehicle 200 may detect and respond to a cut in. As shown, vehicle 200 may be traveling on a roadway 900 along with a target vehicle 902. The target vehicle 902 may be traveling in a first lane 904, while vehicle 200 may be traveling in a second lane 906. While the first lane 904 is shown to be the left lane and the second lane 906 is shown to be the right lane, it will be understood that the first and second lanes 904 and 906 may be any adjacent lanes on the roadway 900. Further, while only two lanes 904, 906 are shown on the roadway 900, it will be understood that more lanes are possible as well. And while the term "lanes" is used for convenience, in some situations (e.g., where lanes may not be clearly marked with lane markers), the term "lane" may be understood to refer to more generally to the pathways along with vehicle 200 and the target vehicle 902 are traveling. For example, in some embodiments, references to a "lane" may refer to a path aligned with a travel direction or path of vehicle 200.

Vehicle 200 may be configured to receive images of the environment surrounding the roadway 900 from, for example, one or more image capture devices associated with vehicle 200, such as image capture devices 122, 124, and/or 126. Vehicle 200 may receive other sensory information as well, such as GPS data, map data, radar data, or lidar data. Based on the images and/or the other sensory information, vehicle 200 may detect the target vehicle 902. For example, vehicle 200 may identify a representation of the target vehicle 902 in the plurality of images. Vehicle 200 may detect the target vehicle 902 in other manners as well, including any of the manners described above in connection with cut in detection module 802.

Further based on the images and/or the other sensory information, vehicle 200 may identify at least one indicator that the target vehicle 902 will change from the first lane 904 to the second lane 906. For example, vehicle 200 may detect based on monocular and/or stereo image analysis of the images (or based on other sensory data, such as radar or lidar data) a position and/or speed of the target vehicle 902, as described in connection with FIG. 5B, and/or a location of one or more road markings on the roadway 900, as described in connection with FIG. 5C. As another example, vehicle 200 may detect that the target vehicle 902 has begun to change lanes, as described above in connection with FIG. 5F. As still another example, vehicle 200 may detect based on map data that the first lane 904 is ending. Vehicle 200 may identify the at least one indicator in other manners as well, including any of the manners described above in connection with cut in detection module 802.

As described above, once the indicator is detected, vehicle 200 may determine whether to undertake a navigational response. In order to minimize both unnecessary braking and sudden braking, vehicle 200 may, in making this determination, consider the presence or absence of predetermined cut in sensitivity change factors that affect the likelihood the target vehicle 902 will cut in to the second lane 906. Where no predetermined cut in sensitivity change factor is detected, a navigational response may be caused in vehicle 200 based on the identification of the indicator and based on a first cut in sensitivity parameter. On the other hand, where a predetermined sensitivity factor is detected, a navigational response may be caused in vehicle 200 based on the identification of the indicator and based on a second cut in sensitivity parameter. The second cut in sensitivity parameter may be different than (e.g., more sensitive than) the first cut in sensitivity parameter.

Additional example situations involving predetermined cut in sensitivity change factors are illustrated in FIGS. 9B-9E.

Figure 9B:
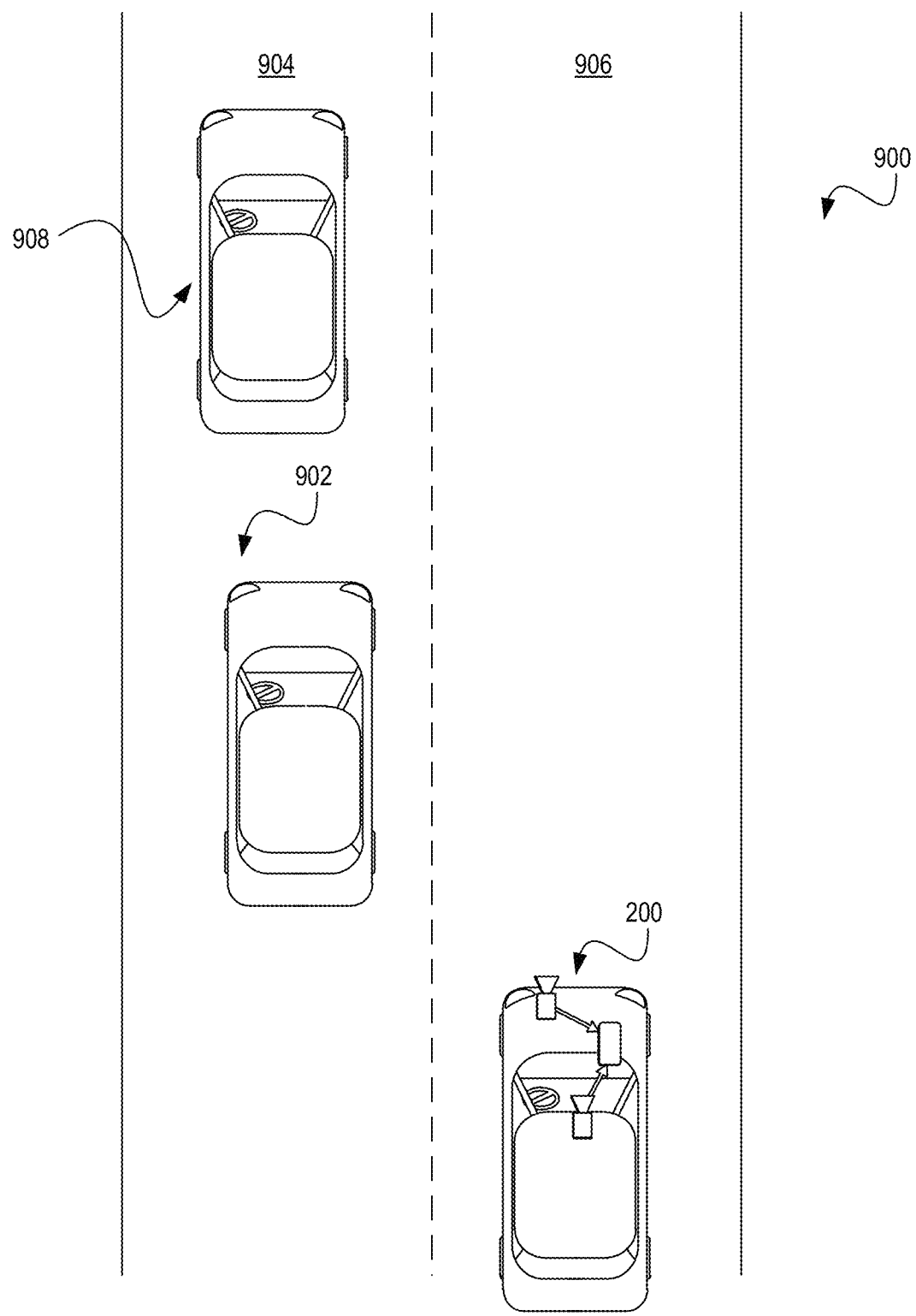
FIGS. 9B-9E illustrate example predetermined cut in sensitivity change factors, consistent with the disclosed embodiments.

FIG. 9B illustrates an example predetermined cut in sensitivity change factor that takes the form of an obstruction in the first lane 904. As shown, the target vehicle 902 is traveling in the first lane 904, and vehicle 200 is traveling in the second lane 906. The obstruction may serve as a predetermined cut in sensitivity change factor where the obstruction causes the target vehicle 902 to be more likely to attempt a cut in than if an obstruction were not present.

As shown, the obstruction may be detected through detection of another vehicle 908 traveling in the first lane 904 ahead of the target vehicle 902. While the obstruction is illustrated to be the other vehicle 908, in some embodiments the obstruction may take the form of a stopped vehicle, an accident, a hazard, a pedestrian, etc. In an embodiment in which the obstruction is another vehicle 908, vehicle 200 may detect the obstruction by detecting that the other vehicle 908 is traveling more slowly than the target vehicle 902. This is because when the other vehicle 908 is traveling more slowly than the target vehicle 902, the slower speed of the other vehicle 908 makes it more likely that the target vehicle 902 will attempt a cut in into second lane 906. Such an obstruction may constitute a predetermined cut in sensitivity change factor.

Vehicle 200 may detect the obstruction in any of the manners described above for detecting a sensitivity change factor in connection with FIG. 8. For example, vehicle 200 may detect based on monocular and/or stereo image analysis of the images a position and/or speed of the other vehicle 908 in addition to that of the target vehicle 902. The position and/or speed of the other vehicle 908 may be detected based on other sensory information as well. As another example, vehicle 200 may detect the obstruction (e.g., the other vehicle 908) based on GPS data, map data, and/or traffic data from, for instance, a traffic application such as Waze. As yet another example, vehicle 200 may detect the obstruction via analysis of radar or lidar data.

When the predetermined cut in sensitivity change factor is detected (that is, when vehicle 200 detects that there is an obstruction in the first lane 904), vehicle 200 may cause a navigational response based on the identification of the indicator and based on a second cut in sensitivity parameter. The navigational response may include, for example, an acceleration of vehicle 200, a deceleration of vehicle 200, or (if possible) a lane change by vehicle 200. The second cut in sensitivity parameter may be more sensitive than a first cut in sensitivity parameter where no predetermined cut in sensitivity change factor is detected, as the presence of the predetermined cut in sensitivity change factor makes it more likely that the target vehicle 902 will attempt a cut in into second lane 906.

In some embodiments, the second cut in sensitivity parameter may depend on the presence and behavior of vehicles surrounding vehicle 200. For instance, the second cut in sensitivity parameter may take into account a lateral speed and lateral position of target vehicle 902, and a sensitivity of the second cut in sensitivity parameter may be correlated with a threshold for each of the lateral speed and the lateral position of target vehicle 902. A high lateral speed threshold and/or a low lateral position threshold, for example, may result in a lower sensitivity, delaying a navigational response compared to a low lateral speed threshold and/or a high lateral position threshold, which may result in a higher sensitivity and a quicker navigational response.

A higher sensitivity (that is, a more sensitive cut in sensitivity parameter) may be desirable in certain situations. For example, where target vehicle 902 is moving more quickly than vehicle 200 and the other vehicle 908 is moving significantly more slowly than target vehicle 902 in first lane 904, it is apparent that target vehicle 902 may have to modify its behavior, either by slowing down and staying in first lane 904, slowing down and changing into second lane 906 behind vehicle 200, changing into another lane to the left of first lane 904 (if such a lane exists), or cutting into second lane 906. If target vehicle 902 would have to sharply decelerate to avoid colliding with the other vehicle 908, a cut in to second lane 906 is more likely. Similarly, if target vehicle 902 would have to sharply decelerate to change into second lane 906 behind vehicle 200, a cut in to second lane 906 is more likely.

The sensitivity of the second cut in sensitivity parameter may further depend on the presence and behavior of other vehicles surrounding vehicle 200. For example, where there is no other vehicle 908 in first lane 904 and a distance between to vehicle 200 and the closest vehicle ahead of vehicle 200 in second lane 906 is short, the sensitivity may be lower. As another example, if the other vehicle 908 in first lane 904 is moving at about the same speed as and/or more quickly than target vehicle 902 and a distance between vehicle 200 and the closest vehicle ahead of vehicle 200 in second lane 906 is short, the sensitivity may be lower. As still another example, if target vehicle 902 is in a passing lane (e.g., if first lane 904 is to the left of second lane 906 in a country where vehicles drive on the right side of roadway 900), the other vehicle 908 in first lane 904 is moving at about the same speed as and/or more quickly than target vehicle 902, and a distance between vehicle 200 and the closest vehicle ahead of vehicle 200 in second lane 906 is large, the sensitivity may be slightly higher (e.g., a low to moderate sensitivity). If, in the same situation, target vehicle 902 is not in a passing lane (e.g., if the first lane 904 is to the left of the second lane 906 in a country where vehicles drive on the right side of the roadway 900), then the sensitivity may be lower.

The sensitivity of the second cut in sensitivity parameter may further take into account any acceleration of deceleration by target vehicle 902. For example, if target vehicle 902 is moving more quickly than other vehicle 908 in first lane 904 and target vehicle 902 accelerates, then the sensitivity may be increased. As another example, if target vehicle 902 is moving more quickly than the other vehicle 908 in first lane 904, the required deceleration of target vehicle 902 to avoid a collision with the other vehicle 908 is greater than, for instance, 0.1 g, and target vehicle 902 is not decelerating, the sensitivity may be elevated, but not at a highest level. As still another example, if target vehicle 902 is moving more quickly than the other vehicle 908 in first lane 904, the required deceleration of the target vehicle 902 to avoid a collision with the other vehicle 908 is greater than, for instance, 0.5 g, and target vehicle 902 is not decelerating, the sensitivity may be at its highest. But if, in the same situation, the closest vehicle ahead of vehicle 200 in second lane 906 is moving more slowly than target vehicle 902 and the required deceleration of target vehicle 902 to avoid a collision with the closest vehicle ahead of vehicle 200 in second lane 906 is greater than that required to avoid hitting the other vehicle 908, the sensitivity may be high, but not the highest. In the same situation, though, if a lane on the other side of second lane 906 is free enough to permit a more gradual deceleration by target vehicle 902, the sensitivity may be at its highest, as target vehicle 902 will likely attempt to cut in to second lane 906 to reach the lane on the other side of second lane 906. It should be noted that the sensitivity levels described above and throughout the disclosure may exist on a spectrum including any number of sensitivity levels arranged, for example, at any desired relative arrangement along the spectrum.

As another example, if target vehicle 902 is moving more quickly than the other vehicle 908 in first lane 904, the required deceleration of target vehicle 902 to avoid a collision with the other vehicle 908 is greater than, for instance, 0.2 g, and target vehicle 902 decelerates to the speed of vehicle 200 and/or the closest vehicle ahead of vehicle 200 in second lane 906, sensitivity may be highest. As yet another example, if target vehicle 902 is moving more quickly than the other vehicle 908 in first lane 904 and target vehicle 902 decelerates to below the speed of vehicle 200 and/or the closest vehicle ahead of vehicle 200 in second lane 906, sensitivity may be low. As another example, if target vehicle 902 is moving more quickly than the other vehicle 908 in first lane 904, the required deceleration of target vehicle 902 to avoid a collision with the other vehicle 908 is less than, for instance, 0.2 g, and target vehicle 902 is decelerating, the sensitivity may be low.

In some embodiments, vehicle 200 may take into account other behavior of target vehicle 902 in determining the second cut in sensitivity parameter. For example, if target vehicle 902 is in a passing lane (e.g., if first lane 904 is to the left of second lane 906 in a country where vehicles drive on the right side of roadway 900), the other vehicle 908 in first lane 904 is traveling more slowly than target vehicle 902, and target vehicle 902 flashes its headlights at the other vehicle 908, a lower sensitivity may be used, as target vehicle 902 has indicated that it intends to remain in first lane 904. As another example, if target vehicle 902 activates its turn signal, indicating that it intends to attempt a cut in into second lane 906, sensitivity may be high, but not the highest, as target vehicle 902 has indicated that it intends to cut in to second lane 906 but also that it is driving or being driven cautiously. Following activation of the turn signal, for example, a cut in may be detected only where target vehicle 902 exhibits significant lateral motion (e.g., 0.5 m towards the lane marker).

The navigational response undertaken by vehicle 200 may likewise depend on the presence and behavior of vehicles surrounding vehicle 200. For example, while in some cases vehicle 200 may decelerate to permit target vehicle 902 to cut in to second lane 906, in other situations vehicle 200 may accelerate to permit target vehicle 902 to change into second lane 906 behind vehicle 200. Vehicle 200 may accelerate when, for instance, vehicle 200 is traveling under the permitted speed, vehicle 200 and target vehicle 902 are abreast and moving at approximately the same speed, there is no vehicle ahead of vehicle 200 in second lane 906 or the closest vehicle ahead of vehicle 200 in second lane 906 is at a safe distance, there is no other vehicle 908 ahead of target vehicle 902 (or the other vehicle 908 is not moving more slowly than target vehicle 902), or there is no other free lane into which target vehicle 902 could change. In some cases, vehicle 200 may accelerate quickly if required (e.g., if the required deceleration of target vehicle 902 to change into second lane 906 behind vehicle 200 is greater than, for instance, 0.5 g).

Figure 9C:
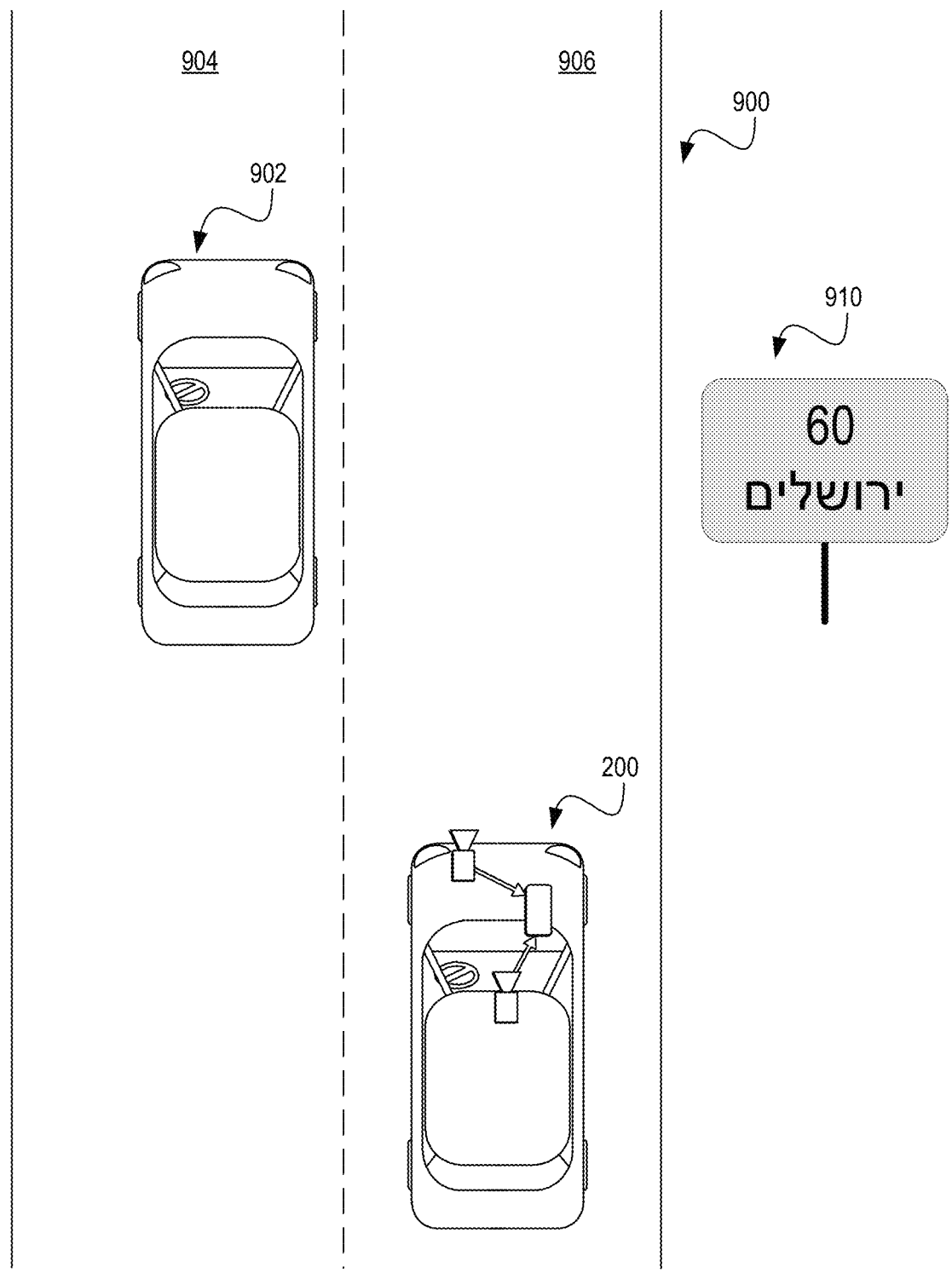

FIG. 9C illustrates an example predetermined cut in sensitivity change factor that takes the form of a geographic area. As shown, the target vehicle 902 is traveling in the first lane 904, and vehicle 200 is traveling in the second lane 906. The geographic area may serve as a predetermined cut in sensitivity change factor where the geographic area (e.g., traffic rules and/or driving customs in the geographic area) causes the target vehicle 902 to be more likely to attempt a cut in than the target vehicle 902 would be were it not located in the geographic area. In some embodiments, the geographical area may include a country or other region with particular legal rules and/or driving customs that govern driving.

As shown, the geographic area may be detected through detection of road sign 910 (e.g., using monocular and/or stereo image analysis of the road sign 910) from which the geographic area may be ascertained. Alternatively or additionally, in some embodiments the geographic area may be ascertained in other manners, such as through detection of one or more geographic indicators or landmarks, using GPS or map data (or other location determination system associated with vehicle 200), etc. By detecting the geographic area, vehicle 200 may determine whether traffic rules and/or driving customs in the geographic area will cause the target vehicle 902 to be more likely to attempt a cut in than the target vehicle 902 would be were it not located in the geographic area. If so, the geographic area may constitute a predetermined cut in sensitivity change factor.

When the predetermined cut in sensitivity change factor is detected (that is, when vehicle 200 detects that the target vehicle 902 is traveling in the geographic area), vehicle 200 may cause a navigational response based on the identification of the indicator and based on a second cut in sensitivity parameter. The navigational response may include, for example, an acceleration of vehicle 200, a deceleration of vehicle 200, or (if possible) a lane change by vehicle 200. The second cut in sensitivity parameter may be more sensitive than a first cut in sensitivity parameter where no predetermined cut in sensitivity change factor is detected, as the presence of the cut in sensitivity change factor makes it more likely that the target vehicle 902 will attempt a cut in into second lane 906.

Figure 9D:
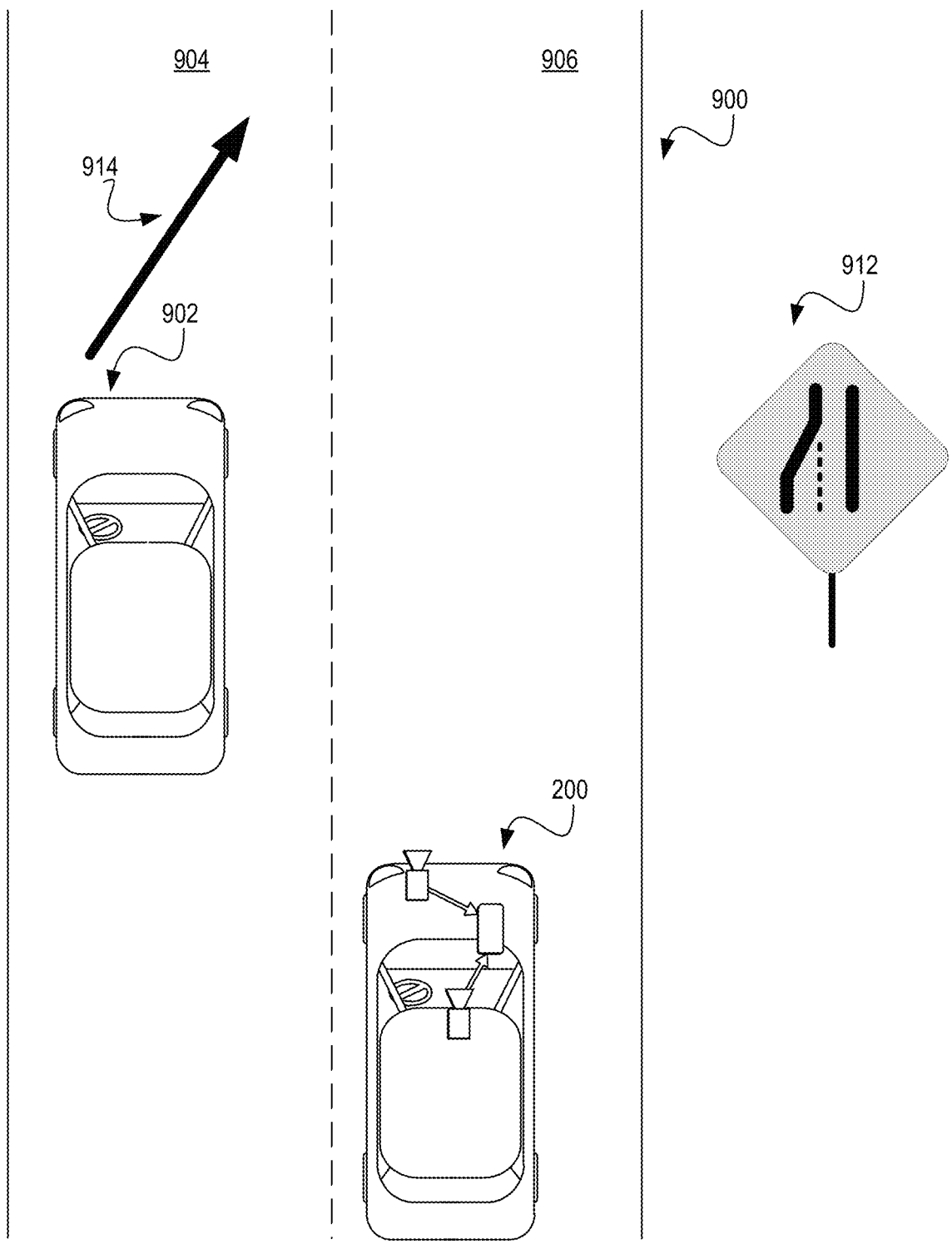

FIG. 9D illustrates an example predetermined cut in sensitivity change factor that takes the form of an end of lane condition. As shown, the target vehicle 902 is traveling in the first lane 904, and vehicle 200 is traveling in the second lane 906. The end of lane may serve as a predetermined cut in sensitivity change factor where the end of lane condition causes the target vehicle 902 to be more likely to attempt a cut in than the target vehicle 902 would be were the first lane 904 not ending.

As shown, the end of lane condition may be detected through detection of road sign 912 (e.g., using monocular and/or stereo image analysis of the road sign 912) and/or detection of road markings 914 (e.g., using monocular and/or stereo image analysis of the road sign 912) from which the end of lane condition may be ascertained. Alternatively or additionally, in some embodiments the end of lane condition may be ascertained in other manners, such as through using GPS or map data (or other location determination system associated with vehicle 200), etc. By detecting the end of lane condition, vehicle 200 may determine that the target vehicle 902 is more likely to attempt a cut in than the target vehicle 902 would be were the first lane 904 not ending. Accordingly, the end of lane condition may constitute a predetermined cut in sensitivity change factor.

When the predetermined cut in sensitivity change factor is detected (that is, when vehicle 200 detects that the first lane 904 is ending), vehicle 200 may cause a navigational response based on the identification of the indicator and based on a second cut in sensitivity parameter. The navigational response may include, for example, an acceleration of vehicle 200, a deceleration of vehicle 200, or (if possible) a lane change by vehicle 200. The second cut in sensitivity parameter may be more sensitive than a first cut in sensitivity parameter where no predetermined cut in sensitivity change factor is detected, as the presence of the cut in sensitivity change factor makes it more likely that the target vehicle 902 will attempt a cut in into second lane 906.

Figure 9E:
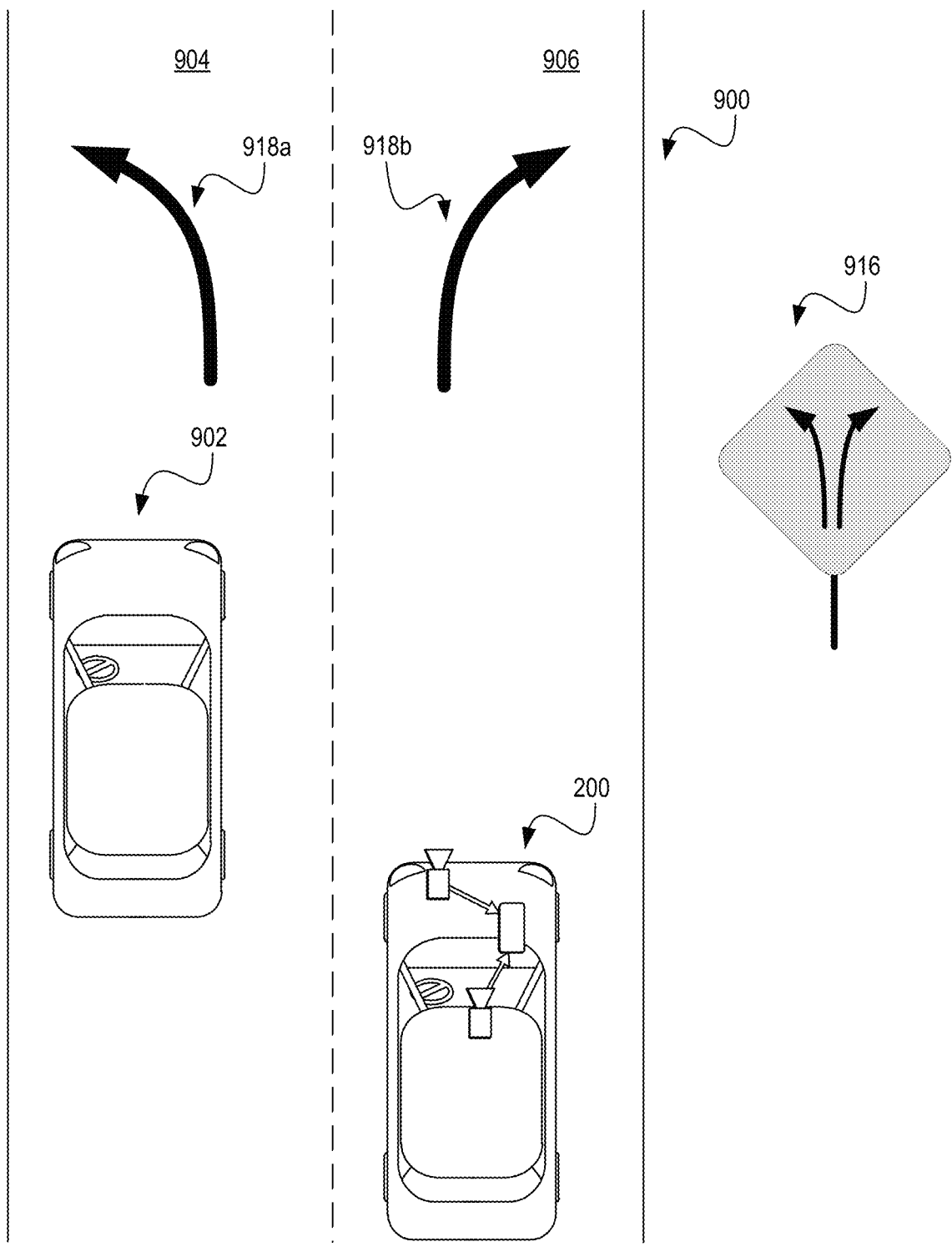

FIG. 9E illustrates an example predetermined cut in sensitivity change factor that takes the form of a roadway split condition. As shown, the target vehicle 902 is traveling in the first lane 904, and vehicle 200 is traveling in the second lane 906. The roadway 900 may be splitting. The roadway split condition may serve as a predetermined cut in sensitivity change factor where the roadway split condition causes the target vehicle 902 to be more likely to attempt a cut in than the target vehicle 902 would be were the first lane 904 not ending.

As shown, the roadway split condition may be detected through detection of road sign 916 (e.g., using monocular and/or stereo image analysis of the road sign 912) and/or detection of road markings 918a, 918b (e.g., using monocular and/or stereo image analysis of the road sign 912) from which the roadway split condition may be ascertained. Alternatively or additionally, in some embodiments the roadway split condition may be ascertained in other manners, such as through using GPS or map data (or other location determination system associated with vehicle 200), etc. By detecting roadway split condition, vehicle 200 may determine that the target vehicle 902 is more likely to attempt a cut in than the target vehicle 902 would be were the roadway 900 not splitting. Accordingly, roadway split condition may constitute a predetermined cut in sensitivity change factor.

When the predetermined cut in sensitivity change factor is detected (that is, when vehicle 200 detects that the roadway 900 is splitting), vehicle 200 may cause a navigational response based on the identification of the indicator and based on a second cut in sensitivity parameter. The navigational response may include, for example, an acceleration of vehicle 200, a deceleration of vehicle 200, or (if possible) a lane change by vehicle 200. The second cut in sensitivity parameter may be more sensitive than a first cut in sensitivity parameter where no predetermined cut in sensitivity change factor is detected, as the presence of the predetermined cut in sensitivity change factor makes it more likely that the target vehicle 902 will attempt a cut in into second lane 906.

While certain predetermined cut in sensitivity change factors have been illustrated, it will be understood that other predetermined cut in sensitivity change factors are possible as well, including any environmental factor that may cause and/or contribute to conditions that cause a cut in by the target vehicle 902 to be more or less likely than it would otherwise be.

Figure 10:
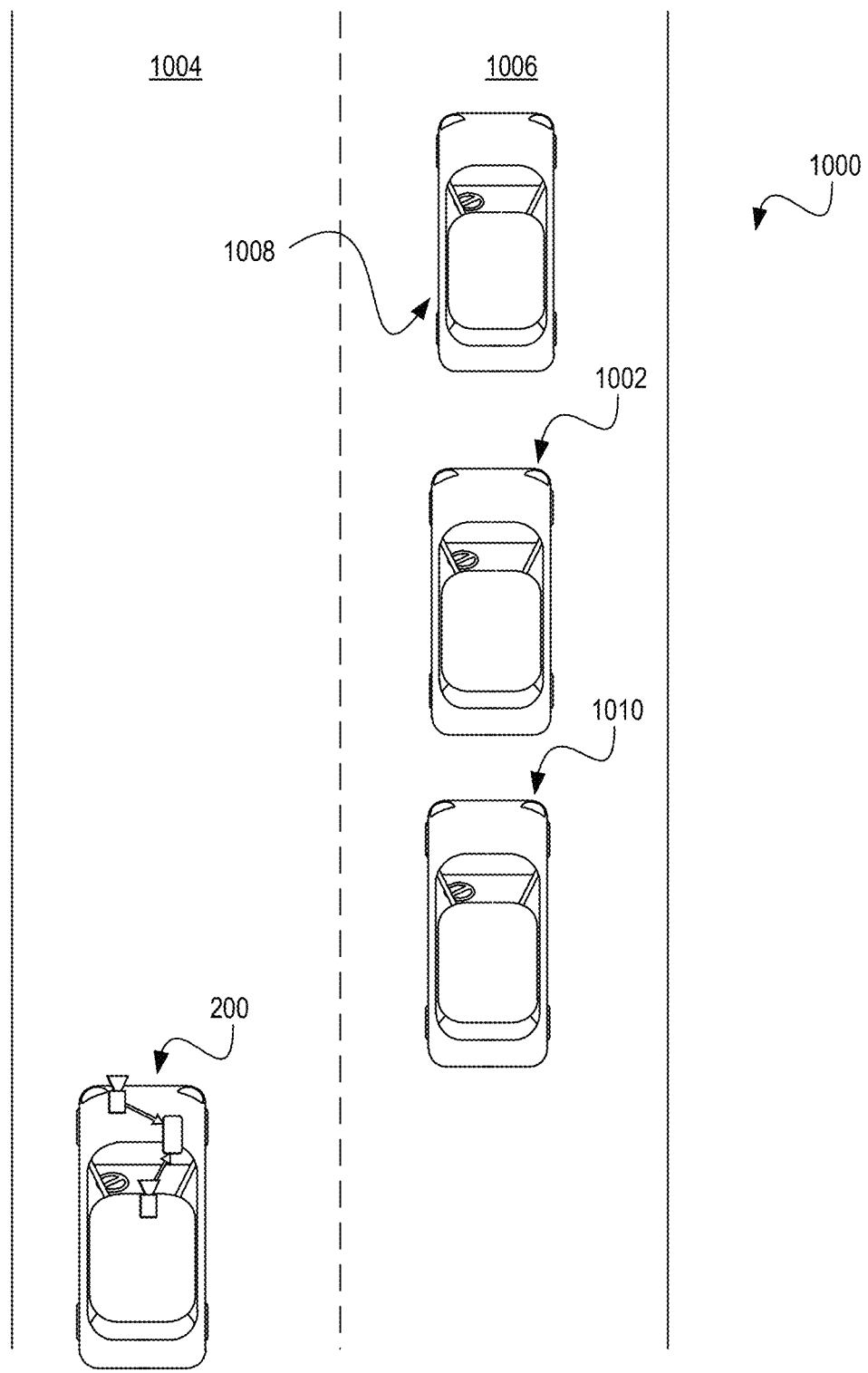
FIG. 10 is an illustration of an example situation in which a vehicle may engage in altruistic behavior, consistent with the disclosed embodiments.

FIG. 10 is an illustration of an example situation in which vehicle 200 may engage in altruistic behavior, consistent with the disclosed embodiments. As shown, vehicle 200 may be traveling on a roadway 1000 along with a target vehicle 1002. Vehicle 200 may be traveling in a first lane 1004, while the target vehicle 1002 may be traveling in a second lane 1006. While the first lane 1004 is shown to be the left lane and the second lane 1006 is shown to be the right lane, it will be understood that the first and second lanes 1004 and 1006 may be any adjacent lanes on the roadway 1000. Further, while only two lanes 1004, 1006 are shown on the roadway 1000, it will be understood that more lanes are possible as well. And while the term "lanes" is used for convenience, in some situations (e.g., where lanes may not be clearly marked with lane markers), the term "lane" may be understood to refer to more generally to the pathways along with vehicle 200 and the target vehicle 1002 are traveling.

Vehicle 200 may be configured to receive images of the environment surrounding the roadway 1000 from, for example, one or more image capture devices associated with vehicle 200, such as image capture devices 122, 124, and/or 126. Vehicle 200 may receive other sensory information as well, such as GPS or map data. Further, in some embodiments, vehicle 200 may receive other sensory information, such as information acquired via a radar device or lidar device included in system 100. Based on the images and/or the other sensory information, vehicle 200 may detect the target vehicle 1002. For example, vehicle 200 may identify a representation of the target vehicle 1002 in the plurality of images. Vehicle 200 may detect the target vehicle 1002 in other manners as well, including any of the manners described above in connection with cut in detection module 802.

Further based on the images and/or the other sensory information, vehicle 200 may determine one or more situational characteristics associated with the target vehicle 1002. A situational characteristic may be, for example, any characteristic that indicates the target vehicle 1002 would benefit from changing lanes into the lane in which vehicle 200 is traveling. For example, as shown, a situational characteristic may indicate that the target vehicle 1002 is traveling behind another vehicle 1008 that is traveling more slowly than the target vehicle 1002. In general, the situational characteristic may indicate that, while a cut in or other navigational response by the target vehicle 1002 may not be necessary, a cut in would benefit the target vehicle 1002.

In some embodiments, vehicle 200 may detect based on monocular and/or stereo image analysis of the images a position and/or speed of the target vehicle 1002, as described in connection with FIG. 5B, and/or a location of one or more road markings on the roadway 900, as described in connection with FIG. 5C. As another example, vehicle 200 may detect that the target vehicle 1002 has begun to change lanes, as described above in connection with FIG. 5F. As yet another example, vehicle 200 may detect that target vehicle 1002 has begun to change lanes based on analysis of other sensory information, such as information acquired via a radar device or lidar device included in system 100. Vehicle 200 may identify the one or more situational characteristics in other manners as well, including any of the manners described above in connection with altruistic behavior module 806.

When the one or more situational characteristics are detected, vehicle 200 may determine a current value associated with an altruistic behavior parameter in order to determine whether vehicle 200 will allow the target vehicle 1002 to cut in to the first lane 1004. The altruistic behavior parameter may take any of the forms described above in connection with the altruistic behavior module 806. For example, the altruistic behavior parameter may be set based on input from an operator of vehicle 200, based on at least one informational element determined by parsing calendar entries for an operator or a passenger of vehicle 200, based on an output of a randomizer function, and/or based on a determined number of encounters with target vehicles for which the one or more situational characteristics indicate that the target vehicle would benefit from a course change into the first lane 1004. The altruistic behavior parameter may be fixed or may be updated such that a navigational change in vehicle 200 is caused in at least a predetermined percentage of encounters with target vehicles for which the one or more situational characteristics indicate that the target vehicle would benefit from a course change into a path of vehicle 200. For example, the predetermined percentage may be, e.g., at least 10%, at least 20%, at least 30%, etc.

Vehicle 200 may determine based on the one or more situational characteristics associated with the target vehicle 1002 that a change in the navigation state of vehicle 200 may not be necessary. That is, the one or more situational characteristics may indicate that, while it would benefit the target vehicle 1002 to cut into the first lane 1004, such a cut in may not be necessary (e.g., by traffic rules or for safety). Nevertheless, the target vehicle 1002 may, in some instances, cause at least one navigational change in vehicle 200 to permit the target vehicle 1002 to cut into the first lane 1004, based on the altruistic behavior parameter and the one or more situational characteristics.

For example, where the altruistic behavior parameter may be set based on input from an operator of vehicle 200, the operator may provide input indicating that vehicle 200 should allow the target vehicle 1002 to cut in. Based on the altruistic behavior parameter and the one or more situational characteristics, the target vehicle 1002 may alter its speed to allow the target vehicle 1002 to cut into the first lane 1004. As another example, where the altruistic behavior parameter may be set based on an output of a randomizer function, the randomizer function may provide an output indicating that vehicle 200 may not allow the target vehicle 1002 to cut into the first lane 1004. For example, the randomizer function may output a binary output (e.g., "NO" or "0") or may output a value output that doesn't satisfy a certain threshold (e.g., may output a "2" where the threshold is ">=5"). Based on the altruistic behavior parameter and the one or more situational characteristics, the target vehicle 1002 may maintain its speed to prevent the target vehicle 1002 from cutting into the first lane 1004. As still another example, where the altruistic behavior parameter is set based on at least one informational element determined by parsing calendar entries for the operator of vehicle 200, the operator's calendar entries may indicate that the operator wishes to arrive at a destination by a desired time. The altruistic behavior parameter may indicate that the target vehicle 1002 should be let in so long as the operator will still arrive at the destination by the desired time. Based on the altruistic behavior parameter and the one or more situational characteristics, the target vehicle 1002 effect a navigational change to permit the target vehicle 1002 to cut into the first lane 1004 if doing so will not prevent the operator from arriving at the destination at the desired time, but will not permit the target vehicle 1002 to cut into the first lane 1004 if doing so will prevent the operator from arriving at the destination at the desired time.

In some cases, more than one target vehicle may benefit from cutting into the first lane 1004. For example, as shown, in addition to target vehicle 1002, an additional target vehicle 1010 may be traveling in the second lane 1006 behind the other vehicle 1008. The one or more situational characteristics may indicate that, like the target vehicle 1002, while a cut in or other navigational response by the additional target vehicle 1010 may not be necessary, a cut in would benefit the additional target vehicle 1010. For example, as shown, the additional target vehicle 1010 may also traveling behind the other vehicle 1008, and the other vehicle 1008 may be traveling more slowly than the additional target vehicle 1010. In these cases, the altruistic behavior parameter may cause vehicle 200 to treat each of the target vehicle 1002 and the additional target vehicle 1010 the same (i.e., allowing both or neither to cut into the first lane 1004), or the altruistic behavior parameter may cause vehicle 200 to treat the target vehicle 1002 and the additional target vehicle 1010 inconsistently.

For example, the altruistic behavior parameter may be set based on the number of encounters with the target vehicles, such as vehicles 1002, 1010 for which the situational characteristics indicate that the target vehicle 1002 or 1010 would benefit from a course change into the first lane 1004. For instance, with two target vehicles 1002, 1010, the altruistic behavior parameter may cause vehicle 200 to let only the target vehicle 1002 cut into the first lane 1004, but not the additional target vehicle 1010 (whereas the altruistic behavior parameter may have allowed both of the target vehicle 1002 and the additional target vehicle 1010 to cut in if encountered alone).

As another example, in these cases the altruistic behavior parameter may be updated such that a navigational change in vehicle 200 is caused in at least a predetermined percentage of encounters with the target vehicles 1002, 1010 for which the situational characteristics indicate that the target vehicle 1002 or 1010 would benefit from a course change into the first lane 1004. For instance, the altruistic behavior parameter may specify that vehicle 200 should effect a navigational change in at least 10% of encounters. Based on the altruistic behavior parameter, vehicle 200 may allow in one or both of the target vehicle 1002 and the additional target vehicle 1010 so long as an overall percentage of encounters, continuously determined, cause vehicle 200 to effect a navigational change in at least 10% of encounters.

Furthermore, although consideration of an altruistic behavior parameter has been discussed above in connection with the example shown in FIG. 10, an altruistic behavior parameter may be taken into account under any of the examples discussed above in connection with FIGS. 9A-9E.

Figure 11:
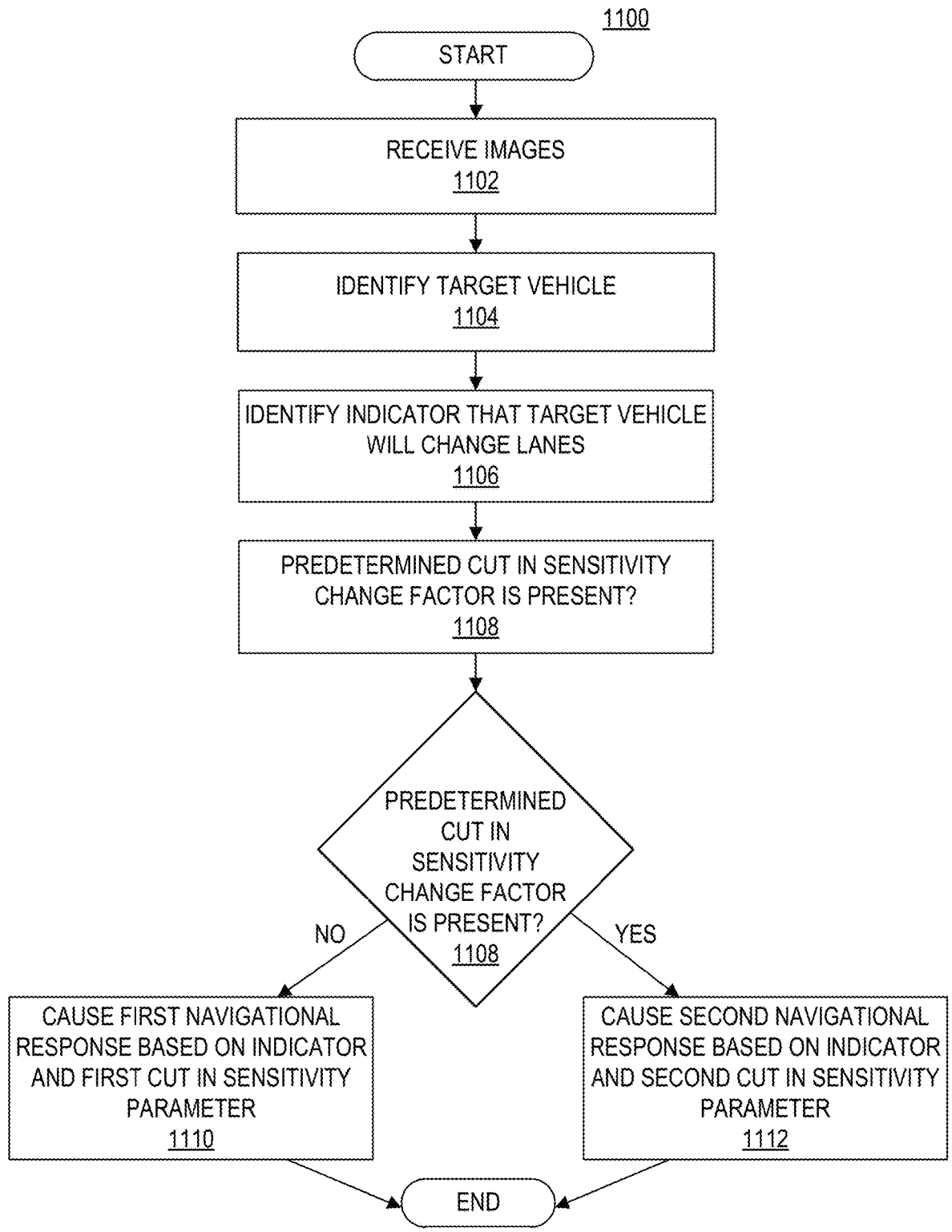
FIG. 11 is a flowchart showing an exemplary process for vehicle cut in detection and response, consistent with disclosed embodiments.

FIG. 11 is a flowchart showing an exemplary process 1100 for vehicle cut in detection and response, consistent with disclosed embodiments. In some embodiments, processing unit 110 of system 100 may execute one or more of modules 402-408 and 802-806. In other embodiments, instructions stored in one or more of modules 402-408 and 802-806 may be executed remotely from system 100 (e.g., vi a server accessible over a network via wireless transceiver 172). In still yet other embodiments, instructions associated with one or more of modules 402-408 and 802-806 may be executed by processing unit 110 and a remote server.

As shown, process 1100 includes, at step 1102, receiving images. For example, vehicle 200 may receive, via a data interface, a plurality of images from at least one image capture device (e.g., image capture devices 122, 124, 126) associated with vehicle 200. As discussed above, in other embodiments, vehicle 200 may instead analyze other sensory information, such as information acquired via a radar device or lidar device included in system 100, as an alternative to or in addition to analyzing images.

At step 1104, process 1100 includes identifying a target vehicle. For example, vehicle 200 may identify, in the plurality of images, a representation of a target vehicle traveling in a first lane different from a second lane in which vehicle 200 is traveling. Identifying the representation of the target vehicle may involve, for example, monocular or stereo image analysis and/or other sensory information, as described above in connection with cut in detection module 802. In other embodiments, as discussed above, identifying the representation of the target vehicle may involve analyzing other sensory information, such as information acquired via a radar device or lidar device included in system 100, as an alternative to or in addition to analyzing images.

At step 1106, process 1100 includes identifying an indicator that the target vehicle will change lanes. For example, vehicle 200 may identify, based on analysis of the plurality of images, at least one indicator that the target vehicle will change from the first lane to the second lane. Identifying the indicator may involve, for example, monocular or stereo image analysis and/or other sensory information (e.g., radar or lidar data), as described above in connection with cut in detection module 802.

At step 1108, process 1100 includes determining whether a predetermined cut in sensitivity change factor is present. For example, vehicle 200 may determine whether at least one predetermined cut in sensitivity change factor is present in an environment of vehicle 200. The at least one predetermined cut in sensitivity change factor may, for example, take any of the forms described above in connection with FIGS. 9A-E. The predetermined cut in sensitivity change factor may include, for example, an end of lane condition, an obstruction in a path of the target vehicle, a roadway split, or a geographic area. Detecting the at least one predetermined cut in sensitivity change factor may involve, for example, monocular or stereo image analysis and/or other sensory information (e.g., rada or lidar data), as described above in connection with cut in detection module 802.

If no predetermined cut in sensitivity change factor is detected, process 1100 may continue at step 1110 with causing a first navigational response based on the indicator and a first cut in sensitivity parameter. For example, vehicle 200 may cause the first navigational response in the vehicle based on the identification of the at least one indicator and based on the first cut in sensitivity parameter where no cut in sensitivity change factor is detected. The first cut in sensitivity parameter may take any of the forms described above in connection with cut in response module 804. Further, as discussed above, in some embodiments, step 1110 may instead include causing a first navigational response based on the indicator and a value associated with a first predetermined cut in sensitivity parameter, the first navigational response may take any of the forms described for navigational responses in connection with FIG. 4.

If, on the other hand, at least one predetermined cut in sensitivity change factor is detected, process 1100 may continue at step 1112 with causing a second navigational response based on the indicator and a second cut in sensitivity parameter. For example, vehicle 200 may cause the second navigational response in the vehicle based on the identification of the at least one indicator and based on the second cut in sensitivity parameter where a cut in sensitivity change factor is detected. The second cut in sensitivity parameter may take any of the forms described above in connection with cut in response module 804. The second cut in sensitivity parameter may be different than (e.g., more sensitive than) the first cut in sensitivity parameter. Further, as discussed above, in some embodiments, step 1112 may instead include causing a second navigational response based on the indicator and a value associated with a second predetermined cut in sensitivity parameter, The second navigational response may take any of the forms described for navigational responses in connection with FIG. 4.

Figure 12:
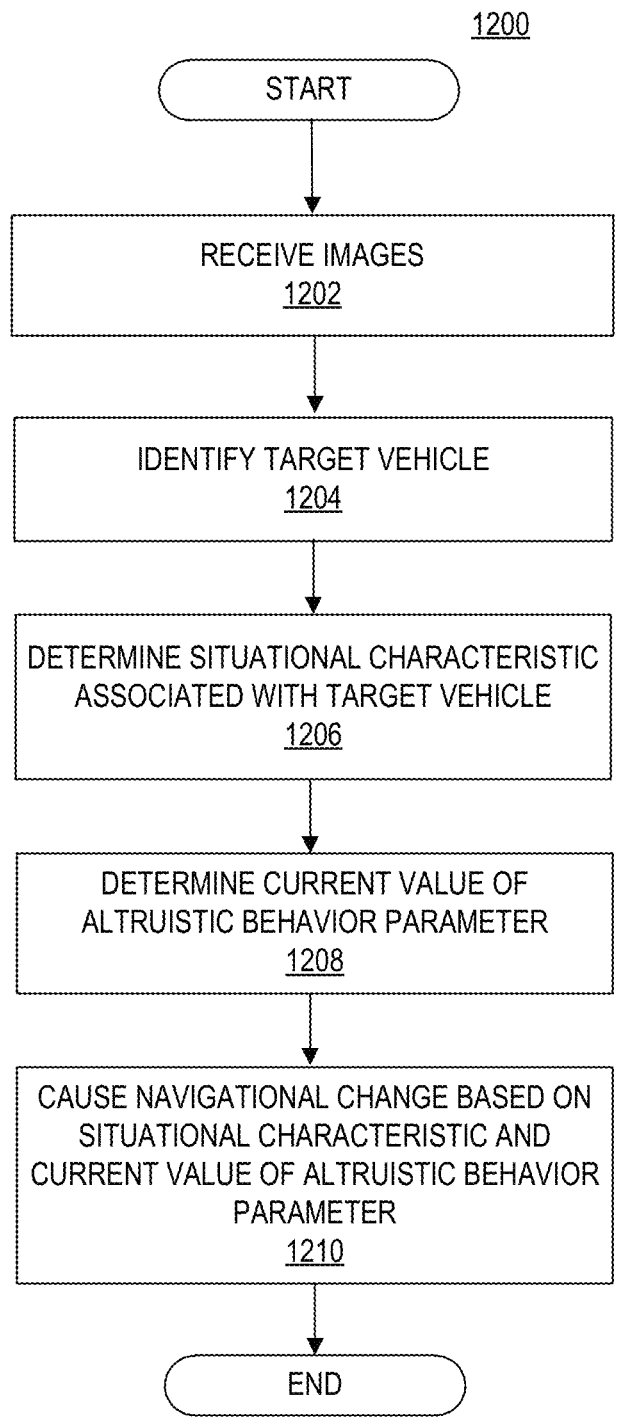
FIG. 12 is a flowchart showing an exemplary process 1200 for navigating while taking into account altruistic behavioral considerations, consistent with disclosed embodiments.

FIG. 12 is a flowchart showing an exemplary process 1200 for navigating while taking into account altruistic behavioral considerations, consistent with disclosed embodiments. In some embodiments, processing unit 110 of system 100 may execute one or more of modules 402-408 and 802-806. In other embodiments, instructions stored in one or more of modules 402-408 and 802-806 may be executed remotely from system 100 (e.g., vi a server accessible over a network via wireless transceiver 172). In still yet other embodiments, instructions associated with one or more of modules 402-408 and 802-806 may be executed by processing unit 110 and a remote server.

As shown, process 1200 includes at step 1202 receiving images. For example, vehicle 200 may receive, via a data interface, a plurality of images from at least one image capture device (e.g., image capture devices 122, 124, 126) associated with vehicle 200. As discussed above, in other embodiments, vehicle 200 may instead analyze other sensory information, such as information acquired via a radar device or lidar device included in system 100, as an alternative to or in addition to analyzing images.

Process 1200 includes at step 1204 identifying a target vehicle. For example, vehicle 200 may identify, based on an analysis of the plurality of images, at least one target vehicle in an environment of vehicle 200. Identifying the target vehicle may involve, for example, monocular or stereo image analysis and/or other sensory information (e.g., radar or lidar data), as described above in connection with altruistic behavior module 806.

At step 1206, process 1200 includes determining one or more situational characteristics associated with the target vehicle. For example, vehicle 200 may determine, based on analysis of the plurality of images, one or more situational characteristics associated with the target vehicle. The situational characteristic(s) may take any of the forms described above in connection with the altruistic behavior module 806 and/or FIGS. 9A-E and 10. For example, the situational characteristic(s) may indicate that the target vehicle would benefit from a course change into a path of vehicle 200. As another example, the situational characteristic(s) may indicate that the target vehicle is traveling in a lane adjacent to a lane in which vehicle 200 is traveling and that the target vehicle is behind a vehicle moving more slowly than the target vehicle and more slowly than vehicle 200. Determining the situational characteristic(s) may involve, for example, monocular or stereo image analysis and/or other sensory information (e.g., rada or lidar data), as described above in connection with altruistic behavior module 806.

At step 1208, process 1200 includes determining a current value of an altruistic behavior parameter. For example, vehicle 200 may determine a current value associated with the altruistic behavior parameter. The altruistic behavior parameter may take any of the forms described above in connection with the altruistic behavior module 806 and/or FIG. 10, and determining the altruistic behavior parameter may be done in any of the manners described above in connection with the altruistic behavior module 806 and/or FIG. 10. The value of the altruistic behavior parameter may be set based on input from an operator of vehicle 200, based on at least one informational element determined by parsing calendar entries for an operator of vehicle 200, based on an output of a randomizer function, and/or based on a determined number of encounters with target vehicles for which the one or more situational characteristics indicate that the target vehicle would benefit from a course change into a path of vehicle 200. Alternatively or additionally, the value of the altruistic behavior parameter may be updated such that a navigational change in vehicle 200 is caused in at least a predetermined percentage (e.g., 10%, 20%, 30%, etc.) of encounters with target vehicles for which the one or more situational characteristics indicate that the target vehicle would benefit from a course change into a path of vehicle 200.

At step 1210, process 1200 includes causing a navigational change based on the one or more situational characteristics and the current value of the altruistic behavior parameter. For example, vehicle 200 may determine based on the one or more situational characteristics associated with the target vehicle that no change in a navigation state of vehicle 200 may be necessary, but may nevertheless cause at least one navigational change in vehicle 200 based on the current value associated with the altruistic behavior parameter and based on the one or more situational characteristics associated with the target vehicle. Causing the navigational change may be done in any of the manners described above in connection with the altruistic behavior module 806 and/or FIG. 10.

As discussed above, in any process or process step described in this disclosure, in addition to performing image analysis of images captured from one or more front and/or rear facing cameras, system 100 (included in vehicle 200) may analyze other sensory information, such as information acquired via a radar device and/or a lidar device.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A vehicle navigation system for a host vehicle, the vehicle navigation system comprising:
at least one processing device comprising circuitry and a memory, wherein the memory includes instructions that when executed by the circuitry cause the at least one processing device to:
receive image data captured by at least one image capture device of the host vehicle, the image data being representative of an environment of the host vehicle;
identify, based on analysis of the image data, a target vehicle traveling in a lane adjacent to a lane in which the host vehicle is traveling;
determine, based on analysis of the image data, that a predetermined cut in sensitivity change factor is present in an environment of the host vehicle, wherein determining that the predetermined cut in sensitivity change factor is present comprises:
tracking a representation of at least one feature in the environment of the host vehicle across multiple image frames, and
generating measurements of the at least one feature using one or more time-based observations; and
based on the determination that the predetermined cut in sensitivity change factor is present, cause a navigational response in the host vehicle.

2. The vehicle navigation system of claim 1, wherein the navigational response in the host vehicle is caused independent of a detection of a navigational change by the target vehicle.

3. The vehicle navigation system of claim 1, wherein the predetermined cut in sensitivity change factor includes an end of lane condition.

4. The vehicle navigation system of claim 3, wherein the end of lane condition is determined based on analysis of the image data.

5. The vehicle navigation system of claim 3, wherein the end of lane condition is determined based on available map data.

6. The vehicle navigation system of claim 1, wherein the predetermined cut in sensitivity change factor includes an obstruction in a path of the target vehicle.

7. The vehicle navigation system of claim 6, wherein the obstruction includes at least one additional vehicle determined, based on the image data, to be moving more slowly than the target vehicle.

8. The vehicle navigation system of claim 1, wherein the predetermined cut in sensitivity change factor includes a lane shift ahead of the target vehicle.

9. The vehicle navigation system of claim 8, wherein the lane shift is detected based on analysis of the plurality of images.

10. The vehicle navigation system of claim 8, wherein the lane shift is determined based on map data.

11. The vehicle navigation system of claim 1, wherein the predetermined cut in sensitivity change factor includes a geographical area in which the target vehicle is located.

12. The vehicle navigation system of claim 11, wherein the geographical area is identified based on analysis of the plurality of images.

13. The vehicle navigation system of claim 1, wherein the navigational response in the host vehicle includes alter a speed of the vehicle.

14. A computer-implemented method for detecting and responding to a cut-in by a target vehicle, the method comprising:
receiving image data captured by at least one image capture device of a host vehicle, the image data being representative of an environment of the host vehicle;
identifying, based on analysis of the image data, a target vehicle traveling in a lane adjacent to a lane in which the host vehicle is traveling;
determining, based on analysis of the image data, that a predetermined cut in sensitivity change factor is present in an environment of the host vehicle, wherein determining that the predetermined cut in sensitivity change factor is present comprises:
tracking a representation of at least one feature in the environment of the host vehicle across multiple image frames, and
generating measurements of the at least one feature using one or more time-based observations; and
based on the determination that the predetermined cut in sensitivity change factor is present, causing a navigational response in the host vehicle.

15. The computer-implemented method of claim 14, wherein the navigational response in the host vehicle is caused independent of a detection of a navigational change by the target vehicle.

16. The computer-implemented method of claim 14, wherein the predetermined cut in sensitivity change factor includes an end of lane condition.

17. The computer-implemented method of claim 14, wherein the predetermined cut in sensitivity change factor includes an obstruction in a path of the target vehicle.

18. The computer-implemented method of claim 14, wherein the predetermined cut in sensitivity change factor includes a lane shift ahead of the target vehicle.

19. A non-transitory computer readable medium containing instructions that when executed by at least one processor, cause the at least one processor to perform a method for detecting and responding to a cut-in by a target vehicle, the method comprising:
receiving image data captured by at least one image capture device of a host vehicle, the image data being representative of an environment of the host vehicle;
identifying, based on analysis of the image data, a target vehicle traveling in a lane adjacent to a lane in which the host vehicle is traveling;
determining, based on analysis of the image data, that a predetermined cut in sensitivity change factor is present in an environment of the host vehicle, wherein determining that the predetermined cut in sensitivity change factor is present comprises:
tracking a representation of at least one feature in the environment of the host vehicle across multiple image frames, and
generating measurements of the at least one feature using one or more time-based observations; and
based on the determination that the predetermined cut in sensitivity change factor is present, causing a navigational response in the host vehicle.

20. The non-transitory computer readable medium of claim 19, wherein the navigational response in the host vehicle is caused independent of a detection of a navigational change by the target vehicle.

21. The non-transitory computer readable medium of claim 19, wherein the predetermined cut in sensitivity change factor includes an end of lane condition.

22. The non-transitory computer readable medium of claim 19, wherein the predetermined cut in sensitivity change factor includes an obstruction in a path of the target vehicle.

23. The non-transitory computer readable medium of claim 19, wherein the predetermined cut in sensitivity change factor includes a lane shift ahead of the target vehicle.

\* \* \* \* \*